US006427870B2

(12) United States Patent
De Laforcade

(10) Patent No.: US 6,427,870 B2
(45) Date of Patent: Aug. 6, 2002

(54) METHODS AND DEVICES FOR DISPENSING A PRODUCT AND FOR SELECTIVELY VARYING A CONCENTRATION OF THE DISPENSED PRODUCTS

(75) Inventor: Vincent De Laforcade, Rambouillet (FR)

(73) Assignee: L'Oreal S.A., Paris (FR)

( * ) Notice: Subject to any disclaimer, the term of this patent is extended or adjusted under 35 U.S.C. 154(b) by 0 days.

(21) Appl. No.: 09/852,271

(22) Filed: May 10, 2001

(30) Foreign Application Priority Data

May 10, 2000 (FR) ........................................ 00 05951

(51) Int. Cl.[7] ........................................ G01F 11/00

(52) U.S. Cl. ........................ 222/1; 222/136; 222/145.1; 222/145.5; 222/321.7; 222/481.5

(58) Field of Search ........................ 222/136, 145.1, 222/145.5, 145.6, 321.7, 321.9, 481.5

(56) References Cited

U.S. PATENT DOCUMENTS 3,851,800 A * 12/1974 Swain .................... 222/145.1
4,893,729 A 1/1990 Iggulden et al. ............. 222/42
5,009,342 A 4/1991 Lawrence et al. .......... 222/136
5,462,203 A * 10/1995 Stern ....................... 222/145.1
5,848,732 A 12/1998 Brugger ...................... 222/137
6,129,245 A * 10/2000 Redman et al. .......... 222/145.1
6,340,257 B1 * 1/2002 Chai-Yi et al. .......... 222/145.1

FOREIGN PATENT DOCUMENTS

GB 1152106 5/1969

OTHER PUBLICATIONS

Co–pending Application No. 09/686,874—Attorney Docket No. 05725.0774–00000 Title: Methods and Devices for Dispensing a Product With a Varying Concentration Inventor(s): Vincent De Laforcade U.S. Filing Date: Oct. 12, 2000.

* cited by examiner

*Primary Examiner*—Joseph A. Kaufman
(74) *Attorney, Agent, or Firm*—Finnegan, Henderson, Farabow, Garrett & Dunner, L.L.P.

(57) ABSTRACT

A dispensing device for dispensing a product includes a first chamber configured to initially contain at least one of a first composition and a mixture of the first composition and a second composition, a second chamber configured to contain the second composition, a flow passage for providing flow of the second composition from the second chamber to the first chamber, a selective air intake mechanism configured to selectively be placed in an open position to allow air to flow into the first chamber and a closed position to prevent air from flowing into the first chamber via the selective air intake mechanism, and an actuator configured to be actuated to cause an amount of a product to be dispensed from the first chamber. The product dispensed includes at least one of the first composition, the second composition, and the mixture of the first composition and the second composition. The device is configured such that in response to the product being dispensed from the first chamber, an amount of the second composition flows from the second chamber to the first chamber via the flow passage when the selective air flow mechanism is in the closed position.

247 Claims, 4 Drawing Sheets

METHODS AND DEVICES FOR DISPENSING A PRODUCT AND FOR SELECTIVELY VARYING A CONCENTRATION OF THE DISPENSED PRODUCTS

The present invention relates to a device for dispensing a product and selectively varying the concentration of the product over at least a portion of the period of use of the device. The product being dispensed preferably is in the form of a flowable substance and may be of very liquid to less liquid consistency, such as in the form of a cream or of an emulsion.

In the field of cosmetics in particular, it is known to package compositions containing either a homogenous phase or a number of separate phases in a container. In the latter instance, typically after the container has been shaken, the separate phases mix together to form a mixture having substantially constant predetermined concentrations of respective compositions forming the mixture. The concentrations of each of the compositions in the mixture are defined by the initial amounts of the respective compositions disposed in the container. Upon each use of the container to mix and dispense the mixture, the dispensed mixture has the same concentrations of the respective compositions.

In the field of cosmetics, and in other fields such as pharmacy or dermatology, or cleaning and the like, it may be desirable to vary the concentration of the respective compositions, or active ingredients, in a product being dispensed. For example, it may be desired to vary the concentration of an active ingredient in a substantially linear manner, from the start to the end of the treatment for which the product is used. In one example, such variation in concentration may be desired when using sunscreens wherein, in the first days of exposure the protection offered by the sunscreen may be maximal, or even total, and may then decrease gradually after a person has been exposed to the sun for few days. A similar characteristic may be desired for the use of products containing self-tanning ingredients. In using these products, the user may desire a very subtle skin coloring effect during the first use or first few uses, followed by an increasingly pronounced skin coloring effect after a number of uses. Another example of a product in which it may be desirable to vary the concentration over time is a thinning product, which may have an increasingly powerful thinning action as the product is used. Yet another example includes certain treatments for the skin or for the scalp, which, because of the aggressive action of some ingredients they contain, may require application at gradually increasing or decreasing concentrations, before being stabilized at a final substantially constant concentration, so that treatment can be pursued with maximum effectiveness. Other related products that may be optimally utilized in varied concentrations over a time period of application include hair dyes and teeth whiteners.

Such application of products in varying concentrations also may be useful in numerous fields and for numerous uses other than cosmetic, pharmaceutical, and dermatological uses. For example, it may be desirable to provide cleaning solutions, shoe polishes, and clothing dyes having varied concentrations over a time period of use of the product.

Conventional techniques for changing the concentration of a product include providing separate packages for each of the different desired concentrations. The numbers of packages required to span a large spectrum of concentration levels may hinder wide-scale personal use of this type of varied-concentration treatment. Furthermore, a system of separate packages for each discrete concentration allows for only a limited number of different concentrations.

Nonetheless, in the context of such a process for dispensing a composition with variable concentration, it may be desirable to be able, at any time throughout the period of use of the dispenser, for example, at the start of treatment, to be able, for a certain length of time, to keep the concentration of the product being dispensed at a set value. For example, a relatively high concentration of an active ingredient may be desirable in the context of an attacking treatment. In dermatology, a skin treatment based on cortisone generally has a first stage in which a high cortisone concentration is applied. After a few days, depending on the type and severity of the affliction, or depending on the patient's skin type, it may be desirable for the cortisone concentration to be reduced gradually until it reaches a baseline value at the end of the treatment, which value may be relatively much lower than that of the attack stage.

For other types of applications, after a certain time period of dispensing either a gradually increasing or decreasing concentration of effective ingredient, it may be desired to revert back to a substantially constant concentration, and then, optionally, to resume again to a variable-concentration cycle.

One of the optional objects of the present invention is to provide a dispenser which allows the dispensing of a product with the concentration of at least one compound contained in the product varying over the course of use of the dispenser, and which at any moment, such as at the start of treatment or sometime thereafter, and for a length of time chosen as desired, for example as a function of the nature of the product and of the circumstances of the treatment surrounding the application, allows the concentration of various active ingredients or of a particular compound in the product to be stabilized at a substantially constant value.

Another optional object of the invention is to provide a device in which such a variation in concentration is substantially linear, at least over part of the period of use of the dispenser.

Yet another optional object of the invention is to provide such a dispensing device for dispensing a product in varying concentrations such that the concentration of one or more active ingredients or of a particular composition either increases or decreases over a period of use of the dispenser.

Yet another optional object of the invention is to provide a reliable dispensing device having a relatively simple structure that is economical to produce. Optionally, the dispenser may be molded as a single piece.

Otheroptional objects still will become apparent in the detailed description which follows.

The dispenser and methods of dispensing described herein may optionally solve some or all of the problems discussed above with reference to conventional dispensers. It should be understood that the invention could be practiced without performing one or more of the optional objects and/or advantages described above. Certain other optional aspects of the invention will become apparent from the detailed description which follows.

According to an optional embodiment of the invention, a device for dispensing a composition, optionally a cosmetic, pharmaceutical or dermatological composition, comprises a first chamber, or container, containing the composition to be dispensed, a means, capable in response to an actuation command, for dispensing a given volume of the contents from the first chamber, a means for selectively allowing and preventing a flow of air into the first chamber in response to the dispensing of the volume of contents, a second container, or chamber, containing a modifying composition, and a means, in response to reduced pressure in the first chamber, for passing a volume of the modifying composition from the second chamber toward the first chamber. The means for passing a volume of the modifying composition optionally may be in the form of a siphon duct configured to place the first chamber and second chamber in flow communication with each other.

In the case of a composition in the first chamber having a low viscosity, the volume of modifying composition from the second chamber may automatically mix with the composition contained in the first chamber. For a composition of higher viscosity, the device may be shaked in order to improve the homogenization of the product that is to be dispensed.

When the dispensing of a dose from the first chamber is compensated for by a corresponding volume of air intake to the first chamber via the means for selectively allowing and preventing a flow of air into the first chamber, the pressure equilibrium within the device may be maintained. As such, the modifying composition initially contained in the second container may not be drawn into the first chamber. During the next dispensing cycle, the composition dispensed may therefore have substantially the same concentration as it did during the previous dispensing cycle. By contrast, when a variable-concentration dispensing cycle is desired, the means for selectively allowing and preventing air flow into the first chamber may not provide air flow into the first chamber. The volume of contents dispensed in this case may be compensated for by a corresponding volume of the modifying composition, therefore varying the concentration of the contents dispensed during the next cycle. Once all of the contents of the second chamber have been drawn into the first chamber, the concentration of the product dispensed may be stable, i.e., substantially constant, again, and may remain so until all of the contents of the device have been dispensed.

In the case of a skin treatment with cortisone, during an attack phase, which may last, for example, for 8, 10, or 12 days, the composition optionally has a set and relatively high cortisone concentration. For safety reasons, a visual marking, such as of the type with graduations, may be provided on the first container (part of which may be transparent) so as to allow the user to see how much of the product has actually been dispensed at the relatively high concentration during the attack phase. After this first phase, the cortisone concentration optionally decreases gradually over a given period depending on factors such as, for example, the volume of modifying composition, the amount of product dispensed during each application, and the frequency of application. During a maintenance phase, the length of which optionally is inversely proportional to the length of the first phase, the concentration of the product dispensed may be stable again, with a value markedly lower than the value of the concentration during the first phase.

The means for selectively allowing a flow of air into the first chamber may comprise at least one orifice providing selective flow communication between outside air and the first chamber. A means for selectively shutting off (or blocking) and uncovering (or unblocking) the orifice also may be provided to prevent flow communication between the first chamber and outside air via the orifice. Such means for selectively blocking the orifice may comprise a blocking member, such as a slidable shutter for example, moveable between a closed position in which the orifice is blocked and an open position in which the orifice is unblocked.

It is contemplated that the means for selectively allowing a flow of air into the first chamber can have substantially any form that allows a user to selectively permit air flow or prevent air flow through into the first chamber via the means. For example, a selectively operable valve capable of opening and closing could be employed or an air flow passage with any type of blocking members capable of selectively blocking and unblocking the air flow passage also could be employed. A user's finger could serve as a blocking member to selectively block and unblock the air flow passage during dispensing. In certain embodiments, it may be desirable to employ an automatic blocking and unblocking mechanism that is timed or otherwise programmed to switch between allowing air intake into the first chamber for constant concentration dispensing and preventing air intake into the first chamber during variable concentration dispensing. Such an automatic configuration could be programmed according to the type of treatment desired.

Optionally, an air intake member in flow communication with the second chamber may be provided for allowing a volume or amount of outside air to enter the second chamber, the amount or volume of outside air substantially corresponding to the volume or amount of modifying composition flowing from the second chamber. This air intake member may be particularly suitable when the second chamber is in a rigid or semi-rigid form. In an alternative, the modifying composition may be contained inside a flexible pouch, such as a pouch made of a metal/thermoplastic complex, for example, the walls of which may be collapsible in on themselves in response to the loss of modifying composition volume transferred from the second chamber to the first chamber. In the latter instance, the entry of air into the second chamber could be avoided. Nonetheless, if the flexible pouch is contained inside a rigid vessel, the latter optionally may be at atmospheric pressure so as to allow the pouch to deform. A corresponding volume or corresponding amount should be understood herein as meaning a volume or amount sufficient to allow pressure equilibrium to be substantially re-established in the dispenser device.

Optionally, the means capable, in response to the dispensing of said given volume of composition from the first chamber, of allowing a volume of the modifying composition to pass from the second chamber to the first chamber includes a suitable flow passage. For example, such a flow passage may be in the form of a duct having a U-shape and/or a siphon, arranged between the first and second chambers. The siphon constitutes one optional embodiment of the invention in so far as it allows the device to be molded in a single piece without the need for additional valves or other similar flow control mechanisms, between the two chambers.

Optionally, the product from the first chamber may be dispensed under pressure by means, such as a pumping member, for example, a manually actuated pump. Alternatively, the first chamber may comprise elastically deformable walls and a valve may be provided on a top portion of the first chamber for dispensing the product. For example, the valve could be of the type that does not take in air, such as a one-way-opening valve, for example. In this case, the product may be dispensed by squeezing the walls of the first container so as to force some of the product to be dispensed through an outlet orifice on which the valve is mounted. The deformed walls may revert to their initial configuration, for example by elastic return, either when a corresponding volume of modifying composition is drawn in from the second chamber or when air is selectively drawn in through the means for selectively allowing a flow of air into the first chamber. In this embodiment, the flexible walls of the first container essentially form an actuator such that upon squeezing the flexible walls, the product in the first container preferably will be dispensed in such a way as to force the product through an outlet orifice on which the airless valve is mounted, and out of the dispensing device. This configuration of the actuator may not lead to a precisely dosed dispensing, and therefore, if such precisely dosed dispensing is desired, a suitable pump configuration like that described above may be employed instead. Other actuators aside from a moveable portion operably coupled to a pump or flexible walls of the container may also be used to cause the product in the first chamber of the device to pass out of the chamber and are contemplated as being within the scope of this invention.

In the case of a configuration of the type which has been described above, the orifice for the selective intake of air into the first container may also be fitted with a one-way valve capable of opening in response to a decrease in the amount of product inside the first container so as to allow air to enter in response to such a decrease. This also may prevent any unwanted exit of the product from the first container, particularly in the event of a raised pressure inside the first container.

According to an embodiment of the invention, when the means for selectively allowing a flow of air into the first chamber allows the flow of air into the first chamber, the contents dispensed may be at a set concentration. By contrast, when means for selectively allowing a flow of air into the first chamber does not provide the flow of air into the first chamber, after a predetermined amount of product is initially pumped from the first chamber, and for as long as some modifying composition remains in the second chamber, a substantially equivalent amount of modifying composition contained in the second chamber may be drawn into the first chamber so that the overall volume of product in the first chamber does not vary.

Assuming a modifying composition is used which is less concentrated in the active, or effective, ingredient than the composition initially contained in the first chamber, each amount of modifying composition conveyed from the second chamber into the first chamber will play a part in gradually decreasing the concentration of the active ingredient in the product dispensed from the first chamber and out of the device.

Assuming a modifying composition is used which is more concentrated in the active, or effective, ingredient than the composition contained initially in the first chamber, each volume of modifying composition conveyed from the second chamber and into the first chamber will play a part in gradually increasing the concentration of the active ingredient in the product dispensed from the first chamber and out of the device.

When all of the contents of the second chamber have been drawn out of the second chamber and into the first chamber, the concentration of the product contained in the first chamber will stabilize and reach a final value at most equal to the concentration of the modifying composition initially in the second chamber. In practice, the greater the volume of the second chamber by comparison with the volume of the first chamber, or at least by comparison with the amount of composition initially in the first chamber, the closer the final value of the concentration of the product contained in the first chamber will be to the concentration of the modifying composition initially in the second chamber when all of the second composition has passed from the second chamber to the first chamber.

Optionally, a flow passage, which may be in the form of a siphon, is configured to place the first chamber in flow communication with the second chamber. This flow passage may optionally comprise a duct, a first end of which opens into the second chamber via a first orifice located near its bottom, and a second end of which opens into the first chamber via a second orifice located at a level below that of the first orifice. The duct may have a portion located at a level higher up than the maximum level of product in the second container.

Because of the equilibrium of the pressures inside the device, the two compositions, whose interface zone, possibly formed by an air volume or air lock, is located generally at an uppermost level of the siphon duct, do not mix appreciably. However, it may be desirable to provide means for keeping the composition initially contained in the first chamber isolated from the modifying composition contained in the second chamber prior to first use of the dispenser to dispense the product. Such means may be located in the region of the siphon-forming duct and be in the form of a valve or shutter. According to one embodiment, the flow passage duct has, at its uppermost point, a portion having an oblong cross-section. A clip, positioned on the device at the oblong portion, closes off the duct so as to prevent any migration of one composition toward the other. Such a clip may be connected to a cap configured to removably cover the dispensing head. Thus, at the time of first use, when removing the cap, or other suitable removable closure member, the user also removes the clip, thus allowing the two chambers to communicate via the flow passage, or duct.

Alternatively, the duct, which may be in the form of a siphon, comprises a first duct portion, in communication with the first chamber, and a second duct portion in communication with the second chamber, each of the first and second duct portions having a free end sealed by a removable stopper. The first and second duct portions may be placed in communication, after the removal of the stoppers, at the time of first use of the device. When the two portions are placed in communication, the free end of the first portion may be forcibly pushed into the free end of the second, or vice versa. Other means of connection may be envisaged and are considered to be within the scope of this invention.

As an option, to dispense the product from the device, an actuator, such as a push-button, for example, may be operably coupled to a pump. The pump may be configured to be received in an outlet orifice of the first chamber, the outlet orifice being sealed closed by an inlet duct of the manually actuated pump. This pump may be connected to a dip tube extending from the pump into the first chamber such that a free end of the dip tube is disposed proximate a bottom portion of the first chamber.

Also as an option, the air intake member for letting air into the second chamber may be formed as an air intake orifice of the pump, the air intake orifice being in direct flow communication with the second chamber. For this purpose, the manually actuated pump may be mounted in a neck portion of the device with the neck portion opening separately into the outlet orifice of the first chamber, and into an intermediate zone in flow communication with the second chamber. When the pump is placed so as to be received in the outlet orifice of the first chamber, the air intake member preferably is disposed in the intermediate zone. As another optional embodiment of the dispensing device, in lieu of providing both the means for selectively allowing air to flow into the first chamber and the air intake member in flow communication with the second chamber, it is envisioned that a single air intake mechanism could be provided to selectively allow air flow either directly into the first chamber in response to dispensing product therefrom or directly into the second chamber, and not into the first, in response to dispensing the product from the first chamber. For example, such an intake mechanism could be movable between a first position providing air intake to the first chamber and a second position providing air intake to the second chamber.

The maximum fill level of the first and/or of the second chamber may be located below the uppermost point of the flow passage duct. Thus, in order to fill the device, the procedure may include supplying a first composition through the outlet orifice of the first chamber and into the first chamber up to a maximum fill level preferably located below the uppermost point of the siphon duct. The modifying composition may be introduced into the second chamber via the intermediate zone, up to the maximum fill level. By filling the two chambers in this manner, a volume of air may be trapped in the flow passage duct between the two compositions, thus isolating the first composition initially in the first chamber from the modifying composition initially in the second chamber.

As an alternative, the two chambers may be filled from the same chamber (for example from the first chamber) with the same composition. After that, a concentrate, or the like, capable of modifying the relative concentrations of the composition initially in the first chamber and of the modifying composition initially in the second chamber is introduced into one or other of the chambers, as desired.

In an optional form of the device, the neck portion of the dispenser has screw threading capable of engaging with a corresponding screw threading on a dispensing head on which the pump is mounted. The dispensing head may be closed with a removable cap or other suitable removable cover configured to cover a dispensing outlet of the device.

According to one embodiment, the modifying composition in the second chamber is such that, when the selective air intake orifice of the first container is blocked, the curve representing the concentration of at least one active ingredient present in the product pumped from the first chamber, as a function of the number of doses or volume of product pumped, has a portion which has a positive slope.

Alternatively, the modifying composition in the second chamber is such that, when the selective air intake orifice of the first chamber is blocked, the curve representing the concentration of at least one active ingredient present in the product pumped from the first container, as a function of the number of doses or volume of product pumped, has a portion which has a negative slope.

An optional aspect of the invention includes a device for dispensing a product including a first chamber configured to initially contain at least one of a first composition and a mixture of the first composition and second composition, a second chamber configured to contain the second composition, a flow passage for providing flow of the second composition from the second chamber to the first chamber, an actuator configured to be actuated to cause an amount of a product to be dispensed from the first chamber, the product including at least one of the first composition, the second composition, and the mixture of the first composition and the second composition, and a selective air intake mechanism configured to selectively be placed in an open position to place the first chamber in flow communication with air outside the first chamber and in a closed position to prevent flow communication, via the selective air intake mechanism, between the first chamber and air outside the first chamber. The device is further configured such that when the air intake mechanism is in the open position, the amount of second composition in the second chamber remains substantially constant in response to dispensing an amount of the product from the first chamber, and when the air intake mechanism is in the closed position, an amount of the second composition flows from the second chamber to the first chamber via the flow passage in response to dispensing an amount of the product from the first chamber.

Another optional aspect of the invention includes a device for dispensing a product comprising a first chamber configured to initially contain at least one of a first composition and a mixture of the first composition and a second composition, a second chamber configured to be in flow communication with the first chamber and to contain the second composition, an actuator configured to be actuated to cause an amount of product contained in the first chamber to be dispensed from the first chamber, the product including at least one of the first composition, the second composition, and the mixture of the first and second compositions, and a selective air intake mechanism configured to selectively be placed in an open position to place the first chamber in flow communication with air outside the first chamber and in a closed position to prevent flow communication, via the selective air intake mechanism, between the first chamber and air outside the first chamber. The device is further configured to automatically vary over time a concentration of the product dispensed from the first chamber and induce flow of second composition from the second chamber to the first chamber during dispensing of the product when the selective air intake mechanism is in the closed position.

Another optional aspect of the invention includes a device for dispensing a product, comprising a first chamber configured to initially contain at least one of a first composition and a mixture of the first composition and a second composition, a second chamber configured to be in flow communication with the first chamber and to contain the second composition, and an actuator configured to be actuated to cause an amount of product contained in the first chamber to be dispensed from the first chamber, the product including one of the first composition, the second composition, and the mixture of the first and second compositions. The device is configured such that when second composition is in the second chamber, a user may select a dispensing mode chosen from a first dispensing mode wherein a concentration of the product dispensed from the first chamber automatically varies as a function of a total amount of product dispensed from the first chamber, and a second dispensing mode wherein the concentration of the product dispensed from the first chamber remains substantially constant as a function of a total amount of product dispensed from the first chamber.

Yet a further optional aspect of the invention includes a device comprising first chamber, a second chamber, a portion including a dispensing outlet intended to be placed in flow communication with the first chamber to dispense contents of the first chamber, a selective air intake mechanism configured to selectively be placed in an open position to allow a flow of outside air into the first chamber and in a closed position to prevent a flow of outside air into the first chamber via the selective air intake mechanism, and a flow passage for providing flow from the second chamber to the first chamber, wherein the flow passage includes a duct including at least a portion having a substantially U-shape. The substantially U-shaped portion may include a curved section and a pair of leg sections extending from the curved section, the curved section being located above the leg sections and being adjacent to an upper end of the device. A first part of the flow passage preferably initially contains the one of the first composition and the mixture and a second part of the flow passage initially contains the second composition. More preferably, air is initially contained in the flow passage between the first and second parts.

According to yet another optional aspect of the invention, a dispensing device includes a first chamber, a second chamber, a portion including a dispensing outlet intended to be placed in flow communication with the first chamber to dispense contents of the first chamber, a selective air intake mechanism configured to selectively be placed in an open position to allow a flow of outside air into the first chamber and in a closed position to prevent a flow of outside air into the first chamber via the selective air intake mechanism, and a flow passage for providing flow from the second chamber to the first chamber, the flow passage being configured in the form of a siphon. Air may be initially contained in the flow passage between the first and second compositions. The device also may comprise a separation mechanism configured to limit flow through the flow passage.

The device according to certain aspects of the invention, optionally may be configured such that when the selective air intake mechanism is in the closed position or when the dispensing mode is the first dispensing mode, an amount of the product in the first chamber remains substantially constant until substantially all of the second composition initially in the second chamber has flowed from the second chamber. The device also may be configured such that the first chamber remains substantially sealed from air intake when the second composition flows into the first chamber via the flow passage.

The device optionally may include a supplemental air intake mechanism, such as an air intake orifice, in flow communication with the second chamber, the supplemental air intake mechanism being configured to provide flow of intake air into the second chamber. The air intake mechanism may be configured to flow an amount of air from outside the device into the second chamber, the amount of air corresponding approximately to an amount of the second composition flowing from the second chamber via the flow passage. Similarly, the amount of air flowed into the second chamber via the supplemental air intake may be approximately equal to an amount of product dispensed from the first chamber when the second composition flows from the second chamber to the first in response to product being dispensed from the first chamber.

In certain optional embodiments, a flow passage of a device according to the invention includes a duct having a first end opening into the second chamber and a second end opening into the first chamber. The duct may include a portion having an inverted U-shaped configuration, the portion being between the first end and the second end. An uppermost point of the portion optionally is located above the first and second ends and at least one of a maximum fill level of the first chamber and a maximum fill level of the second chamber optionally may be below an uppermost point of the portion. The second end of the duct may be disposed below the first end of the duct. The flow passage may be configured to prevent flow communication of the first and second chambers prior to a first use of the device to dispense the product.

The flow passage also may be configured in the form of a siphon and at least one, and possibly both, of a maximum fill level of the first chamber and a maximum fill level of the second chamber may be located below an uppermost point of the siphon. Alternatively, a maximum fill level of the second chamber may be located above an uppermost point of the siphon. A maximum fill level of the first chamber may be below the selective air intake mechanism.

A device according to the invention may further include a pump in flow communication with the first chamber. Actuation of the pump may cause the pump to dispense the product from the first chamber. In an optional form of the invention, the pump may be a manually actuated pump, and the actuator may be a moveable portion provided on the pump, such as a push-button for example. A dip tube extending from the pump into the first chamber to place the pump in flow communication with the first chamber also may be provided. Optionally, the pump includes an air intake orifice configured to flow air from outside the device into the second chamber. Moreover, the pump may be configured such that the pump does not provide intake air flow into the first chamber. A neck portion of the device may be disposed proximate top portions of the first and second chambers, the neck portion being configured to receive the pump. The neck portion may open so as to be in flow communication with the second chamber and with the first chamber when the pump is not received in the neck portion. The pump may be configured to be threadedly engaged with the neck portion, and may have a portion which sealably closes an orifice leading to the first chamber.

The pump may be configured such that actuation of the actuator causes the pump to dispense an amount of the product from the first chamber without providing intake of air into the first chamber through the pump. The pump also preferably is configured to provide intake flow of a corresponding volume of air into the second chamber when the second composition flows from the second chamber.

The device according to certain aspects of the invention optionally may be configured such that the second composition flows from the second chamber to the first chamber to permit mixing of the second composition with the contents of the first chamber when the device is in a first dispensing mode, or when the selective air intake mechanism does not provide air to flow into the first chamber via the selective air intake mechanism, but to maintain the second composition in the second chamber when the device is in a second dispensing mode, or when the selective air intake mechanism allows air to flow into the first chamber. A pump provided with the device preferably applies a vacuum force to remove contents from the first chamber, the vacuum force inducing the flow of the second composition from the second chamber to the first chamber when the device is in the first dispensing mode, or when the selective air intake mechanism is in the closed position preventing the flow of air via the selective air intake mechanism into the first chamber.

The device may include a removable separation mechanism configured to prevent flow communication between the first and second chambers. The removable separation mechanism may include an external clamp configured to clamp an external portion of the device. The device also may include a removable cover configured to cover a dispensing orifice through which the product is dispensed from the device. Preferably, the removable separation mechanism optionally is configured to place the first and second chambers in flow communication with each other in response to removal of the cover.

The device may be configured such that a curve of the ratio of the amount of second composition in the product dispensed from the device to the amount of first composition in the product dispensed from the device as a function of the amount of the product dispensed from the device, has at least one portion having a positive slope.

According to another aspect of the invention, the device optionally is configured such that the ratio of the amount of second composition in the product dispensed from the device to the amount of first composition in the product dispensed from the device ranges from approximately zero to approximately infinity. Preferably, the ratio remains the same or increases when the actuator is actuated multiple times.

The first chamber of the device may initially contain either the first composition alone or a mixture of the first and second compositions and the second chamber may contain the second composition. According to certain embodiments of the invention, the dispensing device may be configured to automatically vary an amount of the second composition in the product being dispensed when the device is in a first dispensing mode or when a selective air intake mechanism is in a closed position to prevent air from entering the first chamber through the selective air intake mechanism. The product dispensed from the first chamber may be dispensed from the device.

Optionally, at least one of the first and second compositions has an effect chosen from at least one of a cosmetic, pharmaceutical, and dermatological effect. For example, the effect may be on skin color, hair color, and/or sun protection factor. According to an optional aspect of the invention, the first composition includes a sunscreen and the second composition tends to reduce a sun protection factor of the sunscreen as it mixes with the first composition in the first chamber. The device may be configured such that a sun protection factor of the product being dispensed from the device decreases or remains substantially constant as a function of a total amount of the product that has been dispensed from the device. According to another optional aspect of the invention, the second composition may include a skin darkening pigment and a concentration of the skin darkening pigment in the product being dispensed from the device may increase or remain substantially constant as a function of a total amount of the product that has been dispensed from the device.

As an optional embodiment, the first and second chambers of the device are formed by molding plastic material into a single piece. The plastic material may include a thermoplastic material, such as a thermoplastic material chosen from one of a polypropylene and a polyethylene. The first and second chambers may have approximately the same volume. The bottom of the second chamber may be above the bottom of the first chamber.

The device optionally may be configured such that when the second composition flows into the first chamber via the flow passage it becomes mixed with the product in the first chamber. Also optionally, the device may be configured such that the product being dispensed from the dispenser is initially the first composition and then the product being dispensed is the mixture of the first and second compositions. As contents of the first chamber are dispensed, the contents in the first chamber may selectively include increasing amounts of the second composition.

The device also may be configured such that the amount of second composition passing into the first chamber substantially corresponds to the amount of product dispensed from the first chamber when the second composition passes into the first chamber. Optionally, actuation of the actuator causes a portion of the product in the first chamber to be dispensed and a portion of the second composition to flow through the flow passage toward the first chamber when the device in a first dispensing mode or when the selective air intake mechanism in a closed position. The device according to certain embodiments of the invention also may be configured to automatically vary an amount of the second composition in the product being dispensed when the device is in a first dispensing mode or when the selective air intake mechanism is in an open position.

Optionally, the device may be configured such that product being dispensed from the dispenser selectively has one of a varying concentration as a function of the number of times the dispenser is actuated to dispense the product and a constant concentration as a function of the number of times the dispenser is actuated to dispense the product. Whether the concentration is varying or constant may optionally depend on a position of the selective air intake mechanism or in a selected dispensing mode of the device.

The selective air intake mechanism in certain embodiments of the device optionally may include an air intake orifice configured to place the first chamber in flow communication with outside air. The selective air intake mechanism may further optionally include a blocking member configured to block the air intake orifice, and the blocking member may be in the form of a slidable shutter configured to slide to place the air intake mechanism in the open position and in the closed position.

The devices according to the invention optionally have a size permitting the device to be held in a single hand of the user while the contents are dispensed.

Another optional aspect of the invention includes a method of dispensing comprising providing a dispenser having a first chamber containing at least one of a first composition and a mixture of the first composition and a second composition, and a second chamber containing the second composition, the first and second chambers being in flow communication with each other. The method further comprises flowing at least a portion of the contents of the first chamber from the dispenser to dispense the contents, selectively blocking air flow into the first chamber via a selective air intake mechanism in flow communication with the first chamber, and passing second composition from the second chamber to the first chamber in response to the contents of the first chamber being dispensed during the selective blocking of air flow.

Yet a further optional aspect of the invention includes a method of dispensing a product comprising providing a dispenser containing a first composition and a second composition substantially separated from one another prior to dispensing, the first composition and the second composition having at least one differing characteristic. The method further includes flowing a product from the dispenser, the product including relative concentrations of the first and second compositions, and selectively one of increasing and holding substantially constant, in response to a total amount of product flowed from the dispenser, the concentration of second composition in the product flowing from the dispenser.

The method according to an optional aspect of the invention may also comprise initially flowing the first composition alone from the dispenser and then selectively mixing together the first composition and the second composition during the flowing of the product from the dispenser.

The method according to another optional aspect of the invention further includes preventing flow communication between the first and second chambers prior to a first flowing of the contents from the first chamber and then placing the first and second chambers in flow communication with each other.

The flowing from the dispenser may include initially flowing the first composition and then selectively flowing the mixture from the dispenser. A concentration of second composition in the mixture may increase as more second composition is passed into the second chamber. The flowing may thereafter optionally include selectively holding constant the concentration of the second composition in the product flowing from the dispenser.

The method also may include mixing the second composition passing into the first chamber with the contents of the first chamber. The passing may include flowing the second composition from the second chamber toward the first chamber in an amount substantially equal to the amount of the contents flowing from the first chamber.

According to another optional aspect, the method includes intaking an amount of air from outside the dispenser into the second chamber in an amount substantially equal to the amount of the second composition that flows from the second chamber toward the first chamber during the passing when the concentration of the second composition is selectively increased.

The flowing from the first chamber may include pumping from the first chamber via a pump in flow communication with the first chamber. The pump may optionally include an air intake orifice, the air intake orifice flowing air outside the dispenser into the second chamber during pumping.

Optionally, the method further comprises selectively varying the respective concentrations of the first composition and the second composition in the contents as a function of a total amount of the contents flowed from the first chamber.

The flowing of the contents of the first chamber preferably includes selectively automatically varying the respective concentrations of the first composition and the second composition in the contents in the first chamber in response to the flowing, and also may include selectively flowing the second composition from the first chamber after a predetermined amount of one of the first composition and the mixture has flowed from the first chamber.

The flowing from the first chamber preferably includes selectively blocking air intake into the first chamber when the second chamber contains the second composition.

The method may also include passing the second composition via a flow passage including a siphon.

Optionally, an amount of the product in the first chamber may selectively remain substantially constant until substantially all of the second composition initially contained in the second chamber has passed from the second chamber toward the first chamber. Air may be selectively prevented from flowing into the first chamber when the second chamber contains the second composition.

Air optionally may be flowed into the first chamber when the second chamber contains the second composition and when the concentration of second composition in the product flowing from the dispenser is selectively held substantially constant.

Another optional aspect of the invention includes a method of treating a surface, the method comprising dispensing a product including a treatment agent from a dispenser onto a surface to be treated and selectively one of varying a concentration of the treatment agent in the product based on a total amount of the product that has been dispensed from the dispenser and holding substantially constant a concentration of the treatment agent in the product based on a total amount of the product that has been dispensed from the dispenser, wherein the concentration of the treatment agent in the product varies within a range of from approximately zero to approximately one hundred percent.

The methods of the invention may optionally also include applying the product dispensed to skin of an individual for changing skin color or for providing sun protection factor to the skin. Alternatively, the invention may optionally also include applying the product dispensed to hair of an individual for changing hair color.

As an optional aspect, the concentration of an active agent in the product being dispensed may either increase from approximately zero percent to approximately 100 percent or decrease from approximately 100 percent to approximately zero percent as product is dispensed from the dispenser.

Yet other optional aspects of the invention include a method of dispensing a product, the method comprising providing one of the devices according to the invention with the first chamber containing at least the first composition and the second chamber containing the second composition and actuating the actuator to dispense an amount of the product from the first chamber and out of the device. Preferably, the method further comprises selectively one of varying relative concentrations of the first composition and the second composition or holding substantially constant the relative concentrations of the first composition and second composition dispensed out of the device by actuating the actuator a number of times. The relative concentrations of the first composition and the second composition in the product dispensed out of the device optionally may also be selectively varied or held constant as a function of a total amount of the product dispensed out of the device. The method optionally also may include selecting a dispensing mode of the dispensing device or selectively placing the selective air intake mechanism of the device in one of the open position and the closed position.

Yet another optional aspect of the invention includes a method of dispensing a product, the method comprising providing a device according to the invention with the first chamber containing at least a first composition and the second chamber containing a second composition and dispensing an amount of product from the first chamber and out of the device, the product including at least one of the first composition and a mixture of the first and second compositions.

The methods may further include applying the dispensed product to a surface, such as hair or skin, to at least one of change hair color, change skin color, and/or provide sun protection.

Aside from the structural and procedural arrangements set forth above, the invention could include a number of other arrangements, such as those explained hereinafter. It is to be understood that both the foregoing description and the following description are exemplary.

The accompanying drawings are included to provide a further understanding of the invention and are incorporated in and constitute a part of this specification. The drawings illustrate optional embodiments of the invention and, together with the description, serve to explain the principles of the invention. In the drawings, FIG. 1A is a perspective view of a dispensing device according to an optional embodiment of the invention;

Reference will now be made in detail to certain optional embodiments of the invention, examples of which are illustrated in the accompanying drawings. Wherever possible, the same reference numbers are used in the drawings and the description to refer to the same or like parts.

Figure 1A:
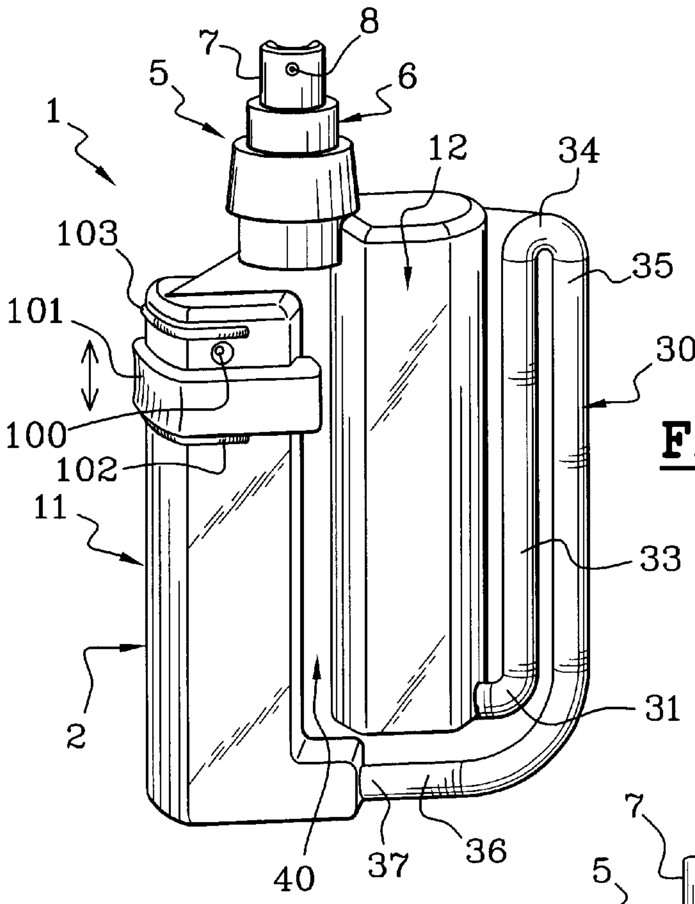
FIG. 1B is a vertical cross-sectional view of the dispensing device of FIG. 1A.
Figure 1B:
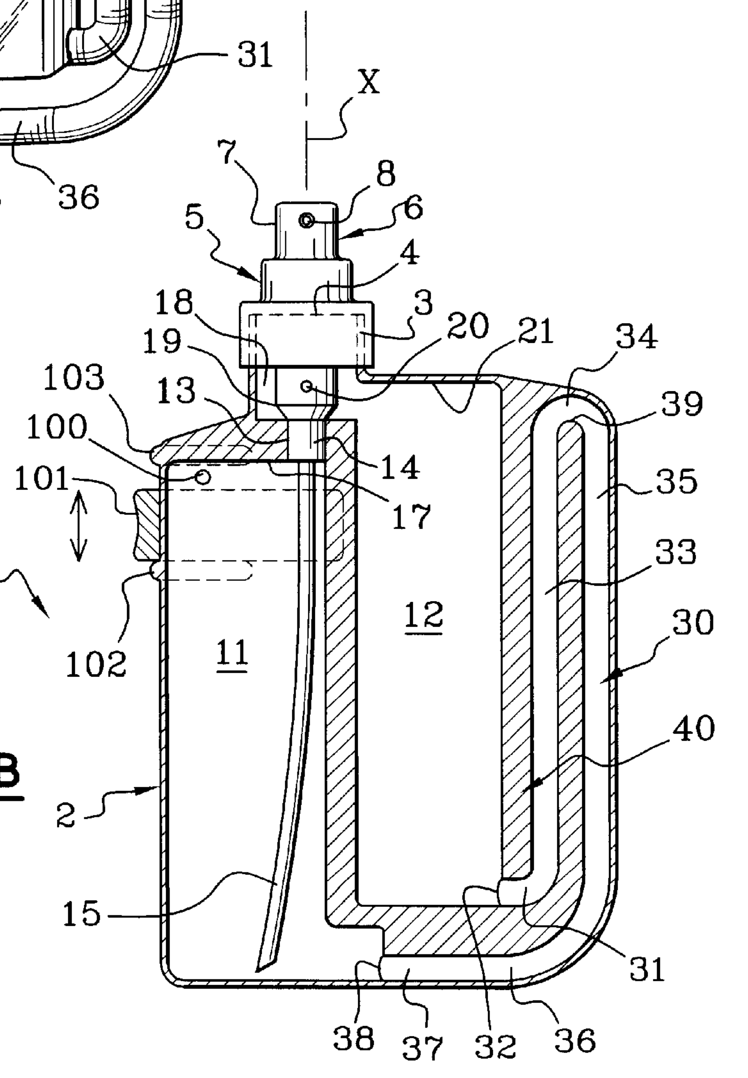

As depicted in FIGS. 1A–1B, the device 1 according to an embodiment of the invention comprises a rigid or semi-rigid body 2, the cross section of which is of elongate shape. The body 2 has a neck portion 3 at one end and a free edge 4 of the neck portion 3 defines an opening in which an actuatable pump 5 is mounted. The pump 5 may be manually actuated by an axially moveable actuator portion 7. The neck portion 3 and the pump 5 are arranged along an axis X, preferably extending from one end of the body 2 to the other opposite end. A dispensing head 6 on a top portion of the pump 5 includes the actuator portion 7, so as to allow the pump 5 to be actuated. The moveable portion 7 may be in the form of a push-button or other similar mechanism. Actuation of the pump 5 causes at least one composition to be dispensed out of a dispensing orifice 8 defined by the moveable portion 7. The dispensing head 6, on which the pump 5 is mounted, includes screw threading (not shown) capable of engaging with corresponding screw threading provided on the outer surface of the neck portion 3.

The body 2 defines two volumes, essentially defining a first chamber 11 configured to initially hold a composition C1 to be dispensed, and a second chamber 12 intended to initially hold a composition C2. The compositions C1 and C2 have differing characteristics and upon mixing form a third composition having a third characteristic. The composition C2 may be referred to as a modifying composition since it modifies the concentration of the composition C1, and thus also is capable of modifying the characteristics and effects of the composition C1, initially contained in the first chamber 11, as it moves from the second chamber 12 into the first chamber 11 to mix with the composition C1.

The first chamber 11 defines an outlet orifice 13 arranged along the axis X and configured to receive, in a sealed fashion, an inlet duct 14 of the pump 5. Dip tube 15 extends from the duct 14 into the first chamber 11, such that the free end of the dip tube 15 is disposed proximate the bottom of the first chamber 11. The first chamber 11 has a maximum fill level corresponding approximately to a transverse surface 17, formed inside the chamber 11, and partially defining the outlet orifice 13. An opening of the outlet orifice 13 in flow communication with the chamber 11 preferably is substantially flush with the transverse surface 17.

At an upper portion of the first chamber, optionally as close as possible to the transverse wall 17, the wall defining the first chamber 11 has a selective air intake orifice 100 passing therethrough. A blocking member in the form of a sliding shutter 101 is mounted by snap-fastening on the wall and can selectively be placed in a first position wherein the air intake orifice 100 is uncovered (i.e., the open position) or in a second position wherein the air intake orifice 100 is sealed (i.e., a closed position). The sliding movement of the shutter 101 is limited by a top stop 103 and a bottom stop 102 disposed on the exterior of the chamber 11. The diameter of the air intake orifice 100 may be on the order of a few tenths of a millimeter. The closed position of the sliding shutter 101 corresponds in particular to the transport position, the storage position, and the position for dispensing variable concentrations of product from the dispenser. The open position of the shutter 101 corresponds to the position for dispensing substantially constant, or set, concentrations of product from the dispenser. Alternatively, in place of the sliding shutter 101, it is possible to employ other suitable selective blocking members, such as, for example, rotatable or pivotable mechanisms, or even a user's finger.

The second chamber 12 is arranged so that it is slightly axially offset above the first chamber 11, and is of substantially the same volume as the volume of the first chamber 11. However, it is contemplated that the relative volumes of the two chambers may be changed as desired to change the variation of the concentration of the product dispensed over the use of the dispensing device. One of ordinary skill in the art would understand how to size the volumes of the chambers to effect the change in concentration depending on such factors as the initial concentrations of the two compositions initially in each of the chambers, the relative mixing capabilities of the two compositions, and other similar factors. The second chamber 12 is in flow communication with an intermediate zone 18 extending in a continuation of the neck portion 3 above the first container 11. In the mounted position, a larger cross-section portion 19 of the inlet duct 14 of the pump 5 is disposed within the intermediate zone 18. This portion 19 of larger cross-section of the duct 14 is in flow communication with an air intake orifice 20 for the pump 5. Thus, the air intake orifice 20 is in flow communication with the second chamber 12 and is isolated from the first chamber 11 when the second chamber 12 or the duct 30 contains a product. According to this embodiment, the maximum fill level of the second chamber 12 roughly corresponds to the level of the wall which includes transverse surface 17 in which the orifice 13 of the first chamber 11 is made.

The first chamber 11 is configured to be placed in flow communication with the second chamber 12 via a flow passage 30, optionally in the form of an inverted U-shaped duct which may be a siphon duct. One end 31 of the flow passage 30 opens into the second chamber 12 via an orifice 32 disposed at the bottom of the second chamber 12. The flow passage 30 has a first duct portion 33 rising up over practically the entire height of the body 2 of the dispenser and connecting onto a U-shaped duct portion 34. U-shaped duct portion 34 then connects to a second duct portion 35 extending down along substantially the entire height of the body 2. The uppermost point 39 of the U-shaped duct portion 34, and of the flow passage 30, is located at approximately the same axial position as the maximum fill level of the second chamber 12 and above the maximum fill level of the first chamber 11. The second duct portion 35 is continued by a lateral part 36, extending from the end of the second duct portion 35 opposite to the U-shaped duct 34 and forming an angle with the second duct portion 35 of approximately 90°. An end 37 of the lateral duct portion 36 defines an orifice 38 in flow communication with the first chamber 11. The orifice 38 is located beneath the orifice 32. Joining zones 40, in the form of a relatively thick wall, are formed between the first chamber 11, the second chamber 12 and the various duct portions of the flow passage 30.

The body 2 of the dispenser 1 preferably is formed by molding a single piece of a material, for example a thermoplastic such as a polyethylene or a polypropylene, or the like.

Figure 2A:
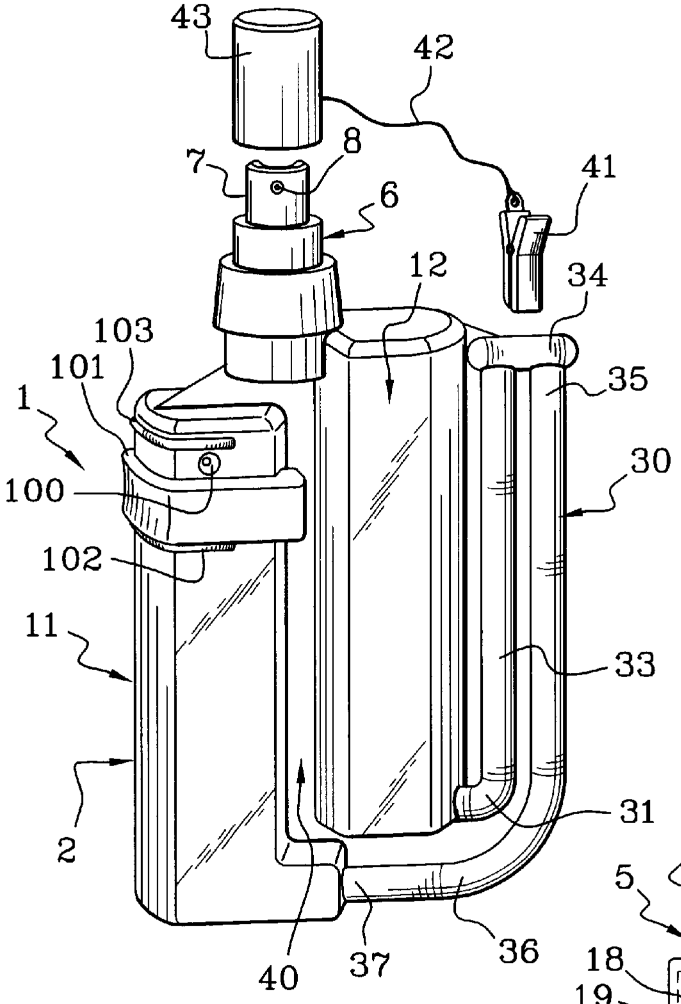
FIG. 2A is a perspective view of an alternative embodiment of a dispensing device including a removable closure and clamp mechanism.
Figure 2B:
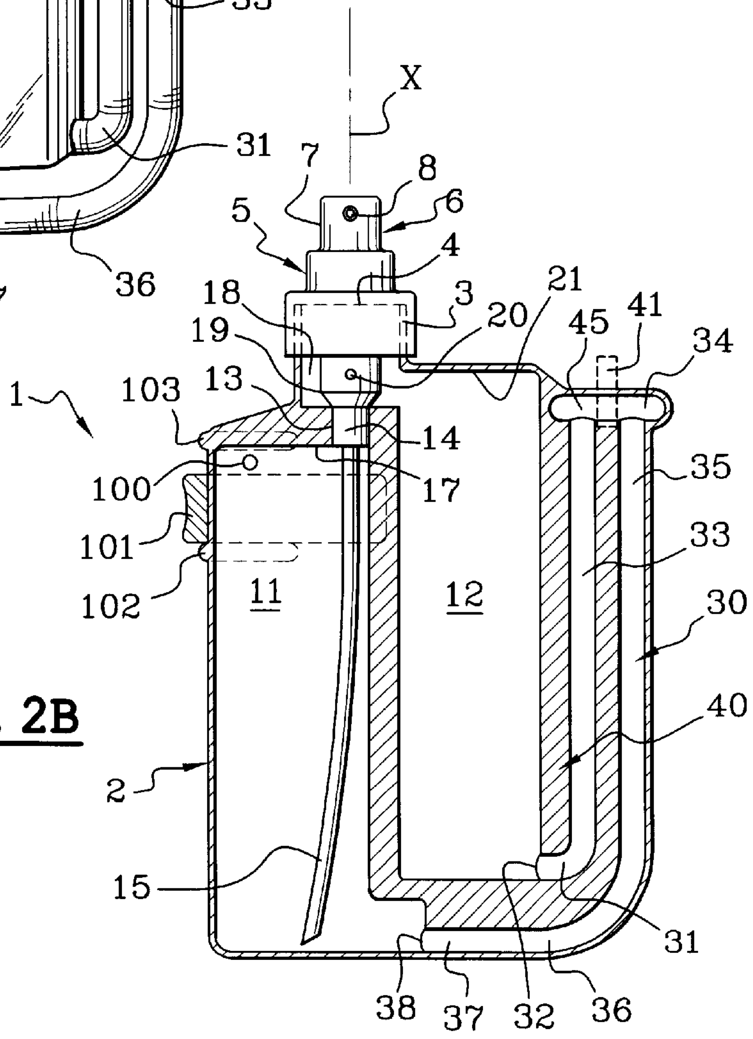
FIG. 2B is a vertical cross-sectional view of a dispensing device showing the engagement of the clamp mechanism of FIG. 2A.

As shown in FIGS. 2A–2B, the flow passage 30 preferably has a hollow oblong shape near the top of the U-shaped duct portion 34. This hollow oblong shape is configured to be deformed and the inner walls of this section held together by a removable clamp mechanism 41, for example in the form of a clip, connected, via a cord 42, to a removable cap 43 configured to cover the dispensing head 6 between uses. Thus fitted, the clip 41 hermetically isolates the composition C2 contained in the second chamber 12 from the composition C1 contained in the first chamber 11, essentially by clamping the U-shaped duct portion 34 and thereby closing off flow communication between the first and second chambers 11, 12. The risk of premature or untimely mixing of the compositions C1 and C2 is thus reduced, particularly while the device is being transported around before it is first used.

Upon first use, by removing the cap 43, tension is exerted on the clip 41 via the cord 42, and the clip 41 is removed. This permits the hollow oblong section 34 to expand and permit flow communication between the first chamber 11 and the second chamber 12. The clip 41 can be fitted either before the two chambers 11,12 are filled, between the filling of the first chamber 11 and the filling of the second chamber 12, or after both chambers 11, 12 have been filled.

Figure 3A:
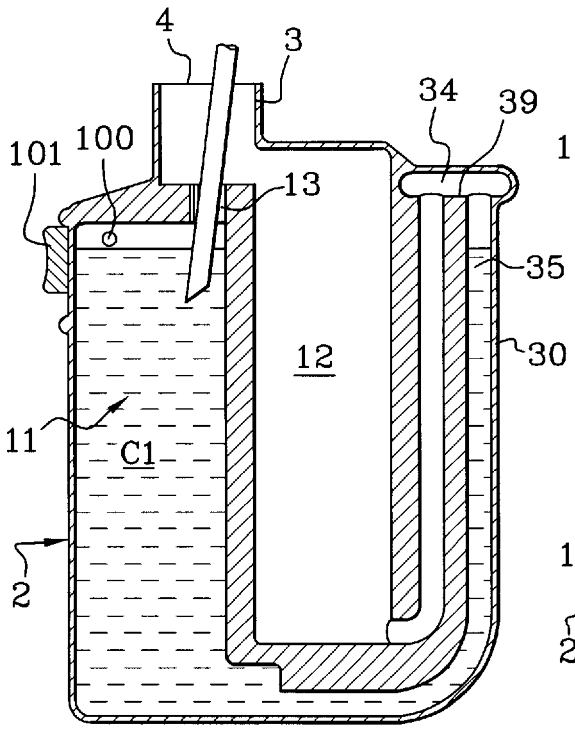
FIG. 3A is a partial vertical cross-sectional view showing a stage of filling the dispensing devices of FIGS. 1A–2B according to an optional aspect.
Figure 3B:
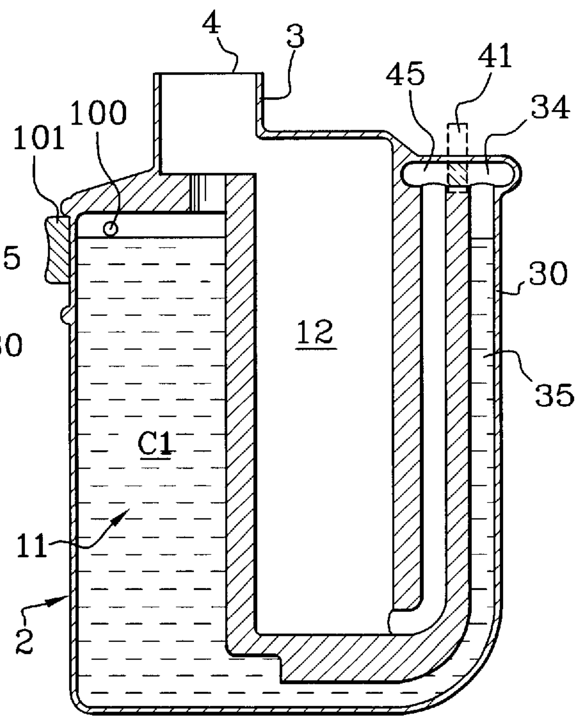
FIG. 3B is a partial vertical cross-sectional view showing another optional stage of filling the dispensing devices of FIGS. 1A–2B subsequent to the stage of filling in FIG. 3A.
Figure 3C:
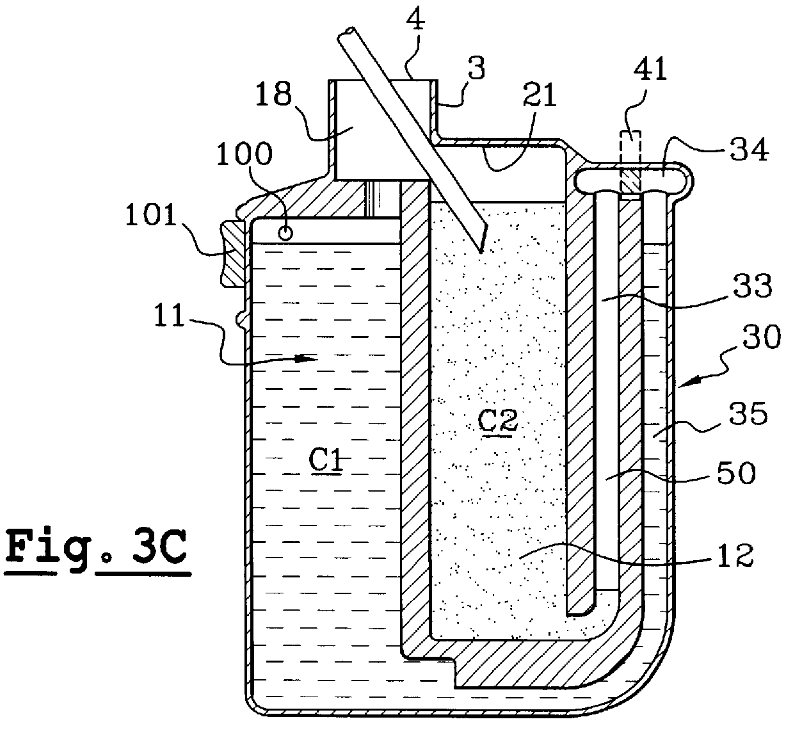
FIG. 3C is a partial vertical cross-sectional view showing an optional stage of filling the dispensing devices of FIGS. 1A–2B subsequent to the stage shown in FIG. 3B.

To fill the dispenser 1, the procedure used may be that illustrated in FIGS. 3A–3C. In FIG. 3A, the composition C1 is introduced into the first chamber 11, via the orifice 13 until the composition C1 reaches the maximum level located below the level fo the selective air intake orifice 100, as described above. During the filling process, the shutter 101 may be in the closed position to seal air intake through the selective air intake orifice 100. The composition C1 also rises up in the second duct portion 35 of the duct 30, without, however, reaching the uppermost point 39 of the wall of the U-shaped duct portion 34 separating the first duct portion 33 from the second duct portion 35. At this point, the clip 41 may be fitted on the portion 45 of oblong cross section of the siphon duct 30 (see FIG. 3B). Next, via the intermediate zone 18, a filling device, preferably in the form of a bent lance, is introduced into the second chamber 12. The composition C2 is introduced into the second chamber 12, until it reaches a maximum fill level located below the uppermost surface of the wall 17 in which the orifice 13 of the first chamber 11 is formed. The composition C2 rises up into the first duct portion 33 of the duct 30, preceded by a volume of air 50. The dispensing head 6 is then screwed onto the neck portion 3 of the dispenser 1, with the inlet duct 14 in sealed engagement inside the orifice 13 (see FIGS. 1B and 2B). The cap 43, as shown in FIG. 2A, connected to the clip 41, is then positioned over the dispensing head 6 and the dispenser is thus ready for use.

Figure 4A:
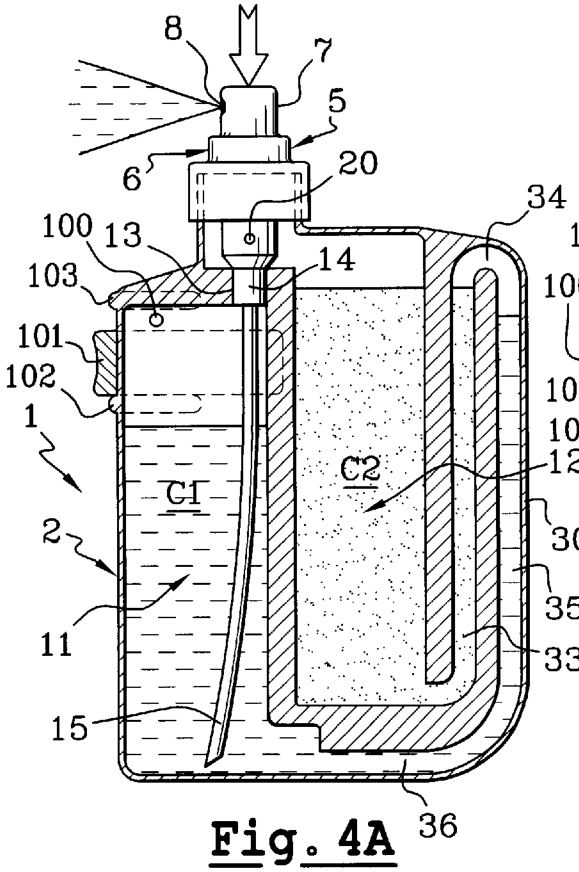
FIG. 4A is a partial vertical cross-sectional view showing a use of the dispensing devices of FIGS. 1A–2A for dispensing a product.
Figure 4B:
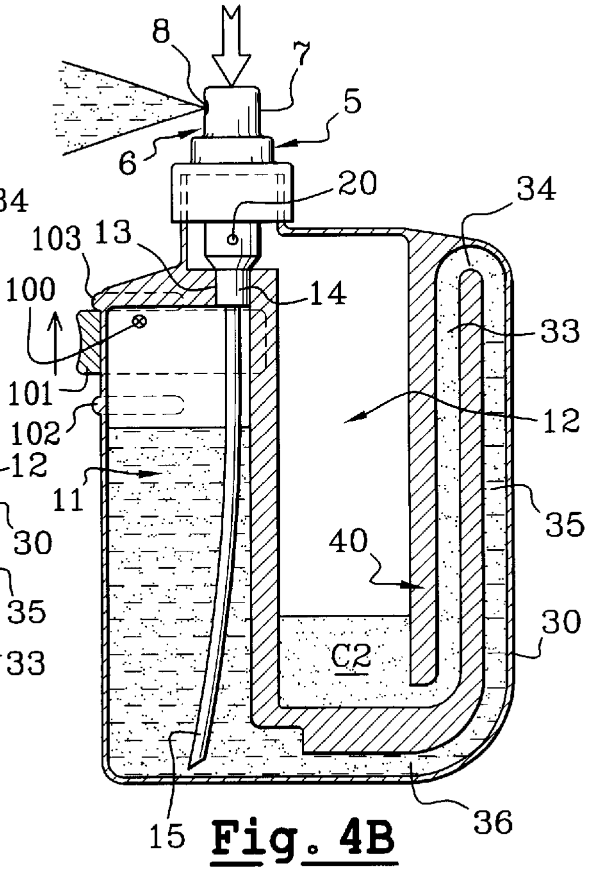
FIG. 4B is a partial cross-sectional view showing a use of the dispensing devices of FIGS. 1A–2A for dispensing a product in a different mode of use than the mode shown in FIG. 4A.
Figure 4C:
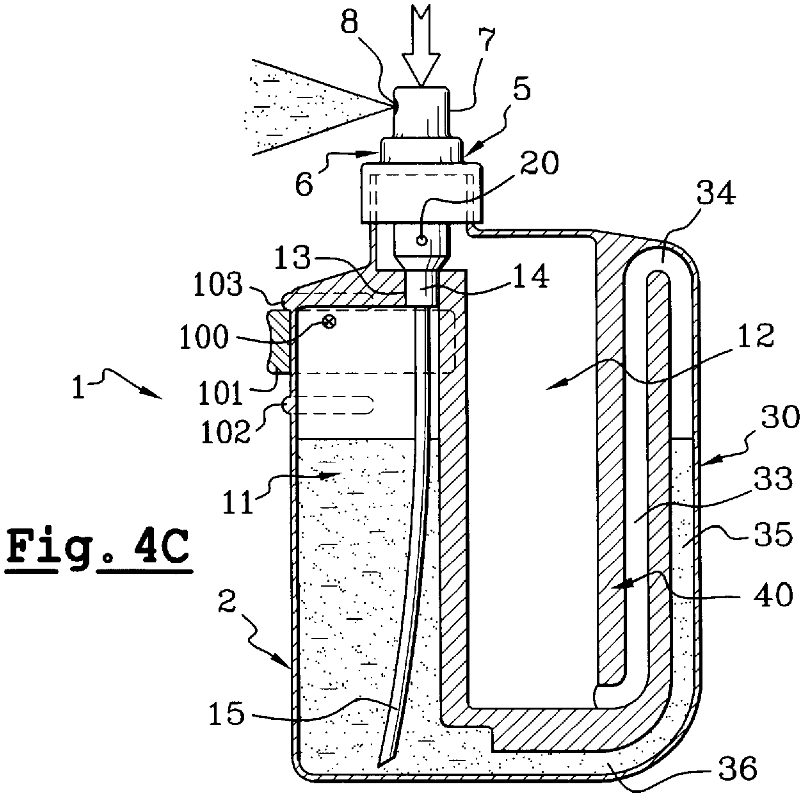
FIG. 4C is a partial cross-sectional view showing a use of the dispensing devices of FIGS. 1A–2A for dispensing a product in a mode subsequent to the mode of FIG. 4B.

The various modes of use of such a dispensing device are depicted in FIGS. 4A–4C. In FIG. 4A, the sliding shutter 101 is in the open position, uncovering the selective air intake orifice 100. In this dispensing mode, each actuation of the pump 5 causes an amount of product, for example in the form of the composition C1 initially contained alone in the first chamber 11 if none of the modifying composition C2 has been passed to the first chamber 11, to be dispensed and air to be drawn into the first chamber 11 through the selective air intake orifice 100. The amount of air drawn into the first chamber through the selective air intake orifice 100 may be sufficient to achieve a pressure equilibrium within the dispenser. The product in the first chamber 11, for example the composition C1 initially contained in the first chamber 11, therefore is dispensed at a substantially constant concentration. The total volume of product contained in the first chamber 11 gradually decreases, while the total volume of product contained in the second chamber remains unchanged during this mode of dispensing.

After a certain length of time, or when desired by the user, the sliding shutter 101 may be moved to the closed position, sealing of the selective air intake orifice 100. This position is depicted in FIG. 4B. In the closed position, in response to the decrease in volume of product, or pressure reduction, generated in the first chamber 11 after one or more pumping operations, the modifying composition C2 from the second chamber 12 begins to enter the first chamber 11, and each volume of product dispensed from the first chamber 11 is replaced by a corresponding volume of the modifying composition C2. The number of pumping operations that may be performed to cause a fraction of the modifying composition C2 to begin to be drawn into chamber 11 may depend on factors such as the volume of composition C1 initially present in the portion 35 of the siphon 30, the volume of air that may be trapped between the compositions C1 and C2 inside the siphon 30, and the volume of the dose of product pumped by the pump, for example. Depending on the relative concentrations of the compositions C1 and C2, an effect of diluting or concentrating the product being dispensed from the pump 5 occurs. In this phase of use, the total volume of the mixture of the compositions C1 and C2, essentially forming a mixed composition C1+C2, in the first chamber 11 remains constant. This effect of dilution or of concentration of the product being pumped from the first chamber 11 and out of the dispenser may occur gradually in response to each pumping operation using the pump 5. Also during this mode of operation, the amount of composition C2 contained in the second chamber 12 may decrease gradually until it becomes zero.

Another mode of the operation of the dispensing device is shown in FIG. 4C. Having completely emptied the second chamber 12, the composition C1+C2 in the first chamber has a concentration that ranges somewhere from the initial concentration of the composition C1 to the initial concentration of the composition C2. The ratio of the volumes of the first and second chambers represents a factor controlling the value of the final concentration of the composition C1+C2 in the first chamber 11. During this mode of use, for each operation of pumping the composition C1+C2, the amount pumped from the dispenser is no longer replaced by a corresponding amount from the chamber 12 or the duct 30. Thus, the level of the product in the first chamber 11 gradually decreases. By contrast, the concentration of the mixture composition C1+C2 is constant. This last mode continues until the first chamber 11, and thus the entire dispenser 1, is completely empty. The length of this mode may in certain embodiments be inversely proportional to the length of the phase during which air was taken in via the selective air intake orifice 100 during pumping from the first chamber 11.

Overall, the dispensing operation described above may comprise three optional main modes: a mode in which the shutter 101 is in an open position and in which a product having a constant concentration, which may be the concentration of the composition C1 initially contained in the first chamber 11, is dispensed; another mode in which the shutter 101 is in the closed position and a product comprising a mixture of the compositions C1 and C2, after some number of pumping operations, is dispensed, in a concentration that changes gradually, for example; and a third mode in which the chamber 12 is empty and a product comprising a composition having a constant concentration that is either intermediate the concentration of the composition C1 and the concentration of the composition C2, or possibly equal to the concentration of the composition C2 initially present in the second chamber, is dispensed until the dispenser is empty.

It should be noted that any other succession of sequences of the modes may be possible depending, for example, on the type of application or on other circumstances relating to application. It may be possible to dispense the entire contents of the device with the sliding shutter 101 in the closed position. In such a case, the curve of the concentration of the product dispensed will have a short substantially flat portion at relatively constant concentration (essentially corresponding to the phase in which the siphon is being primed), a portion with gradually increasing or decreasing concentration, and a final substantially flat portion of relatively constant concentration. As an alternative, in response to a change in the circumstances surrounding the application of composition, such as the desired phase of application, it is possible to make the sliding shutter 101 move from the closed position to the open position during the mode of dispensing at variable concentrations, so as to create a substantially flat region of relatively constant concentration between two modes at variable concentration, etc. As long as some modifying composition C2 remains in the chamber 12, a user may, as desired, move the shutter 101 between the open and closed positions to provide for relatively constant concentration dispensing and variable concentration dispensing, respectively. The concentration of the product dispensed when the shutter is in the open position (i.e., open position phase of dispensing), although remaining relatively constant during a single continuous phase of open position dispensing, will vary between two different open position modes of dispensing depending on the amount of modifying composition C2 that remains in the second chamber 12.

The relative length of each of the modes of use of the dispenser and the slope of the concentration curve in the variable concentration modes may be adjustable by a suitable selection of the main parameters of the dispenser which include, for example, the respective volumes of each chamber, the initial concentration of each of the compositions C1 and C2, the amount of product in each dose of the product pumped out of the dispenser and the first chamber, and the configuration of the flow passage placing the first and second chambers in flow communication.

It is contemplated that the compositions C1 and C2 can have many different forms, such as a liquid, semi-liquid, or solid particulate, and preferably are in the form of a flowable substance. Preferably, the compositions are cosmetic, dermatological, or pharmaceutical compositions used for treating the hair or the skin, however, in its broadest aspects, the present invention could be used to store and dispense many other types of flowable substances. For example, the dispenser may be used to dispense a variety of products, such as cleaning solutions, polishes, clothing dyes, or the like, for which application in a varying concentration over time is desired. Furthermore, sizes of various structural parts and materials used to make these parts are illustrative and exemplary only and one of ordinary skill in the art would recognize that these materials and sizes can be changed as necessary to produce different effects or desired characteristics of the dispensing assembly.

It will be apparent to those skilled in the art that various modifications and variations can be made to the structure and methodology of the present invention. Thus, it should be understood that the invention is not limited to the examples discussed in the specification. Rather, the present invention is intended to cover modifications and variations.

What is claimed is:

1. A device for dispensing a product, comprising:

a first chamber configured to initially contain at least one of a first composition and a mixture of the first composition and second composition;

a second chamber configured to contain the second composition;

a flow passage configured to provide a flow of the second composition from the second chamber to the first chamber;

an actuator configured to be actuated to cause an amount of a product to be dispensed from the first chamber, the product including at least one of the first composition, the second composition, and the mixture of the first composition and the second composition; and a selective air intake mechanism configured to selectively be placed in an open position to place the first chamber in flow communication with air outside the first chamber and in a closed position to prevent flow communication, via the air intake mechanism, between the first chamber and air outside the first chamber, wherein the device is configured such that when the air intake mechanism is in the open position, the amount of second composition in the second chamber remains substantially constant in response to dispensing an amount of the product from the first chamber, and when the air intake mechanism is in the closed position, an amount of the second composition flows from the second chamber to the first chamber via the flow passage in response to dispensing an amount of the product from the first chamber.

2. The device of claim 1, wherein the device is configured such that when the air intake mechanism is in the closed position, an amount of the product in the first chamber remains substantially constant until substantially all of the second composition initially in the second chamber has flowed to the first chamber.

3. The device of claim 1, wherein the device is configured such that when the air intake mechanism is in the closed position, the first chamber remains substantially sealed from air intake when the second composition flows into the first chamber via the flow passage.

4. The device of claim 1, further comprising a supplemental air intake mechanism in flow communication with the second chamber, the supplemental air intake mechanism being configured to provide flow of intake air into the second chamber.

5. The device of claim 4, wherein the supplemental air intake mechanism is configured to flow an amount of air from outside the device into the second chamber when an amount of the second composition flows from the second chamber via the flow passage, the amount of air corresponding approximately to the amount of the second composition flowing from the second chamber via the flow passage.

6. The device of claim 1, wherein the flow passage includes a duct having a first end opening into the second chamber and a second end opening into the first chamber.

7. The device of claim 6, wherein the duct includes a portion having an inverted U-shaped configuration, the portion being between the first end and the second end.

8. The device of claim 7, wherein an uppermost point of the portion is located above the first and second ends.

9. The device of claim 7, wherein a maximum fill level of the second chamber is below an uppermost point of the portion.

10. The device of claim 7, wherein the second end of the duct is disposed below the first end of the duct.

11. The device of claim 1, wherein the flow passage is configured in the form of a siphon.

12. The device of claim 11, wherein the flow passage includes a duct having a first end opening into the second chamber and a second end opening into the first chamber, the second end being located below the first end.

13. The device of claim 11, wherein a maximum fill level of the second chamber is located below an uppermost point of the siphon.

14. The device of claim 11, wherein a maximum fill level of the first chamber and a maximum fill level of the second chamber are located below an uppermost point of the siphon.

15. The device of claim 1, further comprising a pump in flow communication with the first chamber, actuation of the actuator causing the pump to dispense the product from the first chamber.

16. The device of claim 15, wherein the pump is a manually actuated pump, and wherein the actuator is a moveable portion provided on the pump.

17. The device of claim 15, further comprising a dip tube extending from the pump into the first chamber to place the pump in flow communication with the first chamber.

18. The device of claim 15, wherein the pump includes an air intake orifice configured to flow air from outside the device into the second chamber.

19. The device of claim 18, wherein the pump is configured such that the air intake orifice of the pump does not provide intake air flow into the first chamber.

20. The device of claim 15, further comprising a neck portion disposed proximate top portions of the first and second chambers, the neck portion being configured to receive the pump.

21. The device of claim 20, wherein the neck portion opens so as to be in flow communication with the second chamber and with the first chamber when the pump is not received in the neck portion.

22. The device of claim 20, wherein the pump is configured to be threadedly engaged with the neck portion.

23. The device of claim 15, wherein a portion of the pump sealably closes an orifice leading to the first chamber.

24. The device of claim 15, wherein the pump is configured such that actuation of the actuator causes the pump to dispense an amount of the product from the first chamber without providing intake of air into the first chamber when the selective air intake mechanism is in the closed position, and wherein the pump is also configured to provide intake flow of a corresponding volume of air into the second chamber when an amount of the second composition flows from the second chamber.

25. The device of claim 1, further comprising a removable separation mechanism configured to prevent flow communication between the first and second chambers.

26. The device of claim 25, wherein the removable separation mechanism includes an external clamp configured to clamp an external portion of the device.

27. The device of claim 26, further comprising a removable cover configured to cover a dispensing orifice through which the product is dispensed from the device, said removable separation mechanism being configured to place the first and second chambers in flow communication with each other in response to removal of the cover.

28. The device of claim 1, wherein the device is configured such that a curve of the ratio of the amount of second composition in the product dispensed from the device to the amount of first composition in the product dispensed from the device as a function of the amount of the product dispensed from the device, has at least one portion having a positive slope when the selective air intake mechanism is in the closed position.

29. The device of claim 1, wherein the device is configured such that the ratio of the amount of second composition in the product dispensed from the device to the amount of first composition in the product dispensed from the device ranges from approximately zero to approximately infinity.

30. The device of claim 29, wherein the ratio selectively remains the same or increases when the actuator is actuated multiple times.

31. The device of claim 1, wherein the first chamber initially contains one of the first composition and the mixture of the first and second compositions and the second chamber contains the second composition.

32. The device of claim 31, wherein at least one of the first and second compositions has an effect chosen from at least one of a cosmetic, pharmaceutical, and dermatological effect.

33. The device of claim 31, wherein the first composition includes a sunscreen and the second composition tends to reduce a sun protection factor of the sunscreen as it mixes with the first composition in the first chamber.

34. The device of claim 33, wherein the device is configured such that a sun protection factor of the product being dispensed from the device decreases as a function of a total amount of the product that has been dispensed from the device when the selective air intake mechanism is in the closed position.

35. The device of claim 31, wherein the second composition includes a skin darkening pigment and an amount of the skin darkening pigment in the product being dispensed from the device increases as a function of a total amount of the product that has been dispensed from the device when the selective air intake mechanism is in the closed position.

36. The device of claim 1, wherein the first and second chambers are formed by molding plastic material into a single piece.

37. The device of claim 36, wherein the plastic material includes a thermoplastic material.

38. The device of claim 37, wherein the thermoplastic material is chosen from one of a polypropylene and a polyethylene.

39. The device of claim 1, wherein the device is configured such that the second composition flowing into the first chamber via the flow passage becomes mixed with the product in the first chamber.

40. The device of claim 1, wherein the device is configured such that the product being dispensed from the dispenser has one of a varying concentration as a function of the number of times the dispenser is actuated to dispense the product and a constant concentration as a function of the number of times the dispenser is actuated to dispense the product depending on the position of the selective air intake mechanism.

41. The device of claim 1, wherein the device is configured such that the amount of second composition passing into the first chamber substantially corresponds to the amount of product dispensed from the first chamber when the selective air intake mechanism is in the closed position.

42. The device of claim 1, wherein the device is configured such that actuation of the actuator causes a portion of the product in the first chamber to be dispensed and a portion of the second composition to flow through the flow passage toward the first chamber when the selective air intake mechanism is in the closed position.

43. The device of claim 1, wherein the selective air intake mechanism includes an air intake orifice configured to pass air into the first chamber from outside the first chamber.

44. The device of claim 43, wherein the selective air intake mechanism includes a blocking member configured to selectively block the air intake orifice from passing air into the first chamber from outside the first chamber.

45. The device of claim 44, wherein the blocking member is movable between a first position corresponding to the open position of the selective air intake mechanism and a second position corresponding to the closed position of the selective air intake mechanism.

46. The device of claim 44, wherein the blocking member is disposed external to the first chamber.

47. The device of claim 44, wherein the blocking member is in the form of a slidable plate mounted on a wall defining the first chamber.

48. The device of claim 47, wherein the plate slides between a first position blocking the air intake orifice and a second position unblocking the air intake orifice.

49. The device of claim 48, wherein the plate slides between stop members formed on the wall.

50. A device for dispensing a product, comprising:

a first chamber configured to initially contain at least one of a first composition and a mixture of the first composition and a second composition;

a second chamber configured to be in flow communication with the first chamber and to contain the second composition;

an actuator configured to be actuated to cause an amount of product contained in the first chamber to be dispensed from the first chamber, the product including at least one of the first composition, the second composition, and the mixture of the first and second compositions; and a selective air intake mechanism configured to selectively be placed in an open position to place the first chamber in flow communication with air outside the first chamber and in a closed position to prevent flow communication, via the air intake mechanism, between the first chamber and air outside the first chamber, wherein the device is configured to automatically vary over time a concentration of the product dispensed from the first chamber and induce flow of second composition from the second chamber to the first chamber during dispensing of the product when the selective air intake mechanism is in the closed position.

51. The device of claim 50, wherein the device is configured to dispense a product having a constant concentration and to maintain the amount of second composition in the second chamber during dispensing of the product when the selective air intake mechanism is in the open position.

52. The device of claim 50, wherein the device is configured to automatically vary an amount of the second composition in the product being dispensed when the selective air intake mechanism is in the closed position.

53. The device of claim 50, wherein the first chamber initially contains one of the first composition and the mixture, and the second chamber contains the second composition, and wherein the product dispensed from the first chamber has an effect that varies with the concentration of the product.

54. The device of claim 53, wherein the effect is chosen from at least one of a cosmetic, dermatological, and pharmaceutical effect on at least one of skin and hair.

55. The device of claim 50, further comprising a flow passage for placing the first and second chambers in flow communication with each other.

56. The device of claim 55, wherein the flow passage has a first end opening into the second chamber, a second end opening into the first chamber, and a substantially inverted U-shaped portion between the first and the second ends.

57. The device of claim 55, wherein the flow passage is configured to prevent flow communication of the first and second chambers prior to a first use of the device to dispense the product.

58. The device of claim 57, further comprising a removable cover configured to cover a dispensing orifice through which the product flows from the first chamber and out of the device, wherein removing the removable cover permits the flow passage to place the first and second chambers in flow communication.

59. The device of claim 58, wherein the removable cover is operably coupled to a clamping mechanism configured to clamp the flow passage to prevent flow communication between the first and second chambers prior to the first use of the device.

60. The device of claim 50, further comprising a pump configured to flow the product from the first chamber.

61. The device of claim 60, wherein the actuator is operably coupled to the pump such that actuation of the actuator causes pumping of the pump.

62. The device of claim 61, wherein the actuator includes a push-button on the pump.

63. The device of claim 60, further comprising a dip tube extending from the pump into the first chamber to place the pump in flow communication with the first chamber.

64. The device of claim 60, wherein the pump defines an air intake orifice configured to be in flow communication with the second chamber.

65. The device of claim 64, wherein the air intake orifice is configured to flow air from outside the device to inside the second chamber in response to actuation of the pump dispensing the product from the first chamber when the selective air intake mechanism is in the closed position.

66. The device of claim 64, wherein the air intake orifice is configured to flow an amount of air into the second chamber approximately equal to the amount of the product dispensed from the first chamber when the selective air intake mechanism is in the closed position.

67. The device of claim 66, wherein an amount of second composition substantially equal to the amount of air flowed through the air intake orifice flows from the second chamber toward the first chamber as the product in the first chamber is dispensed from the first chamber when the selective air intake mechanism is in the closed position.

68. The device of claim 50, wherein the first chamber is substantially sealed from air intake when the second composition is contained in the second chamber and the selective air intake mechanism is in the closed position.

69. The device of claim 50, wherein an amount of the product in the first chamber remains substantially constant until substantially all of the second composition initially in the second chamber has been flowed to the first chamber when the selective air intake mechanism is in the closed position.

70. The device of claim 50, wherein an amount of the product in the second chamber remains substantially constant as product is dispensed from the first chamber when the selective air intake mechanism is in the open position.

71. The device of claim 50, wherein the selective air intake mechanism includes an air intake orifice configured to pass air into the first chamber from outside the first chamber.

72. The device of claim 71, wherein the selective air intake mechanism includes a blocking member configured to selectively block the air intake orifice from passing air into the first chamber from outside the first chamber.

73. The device of claim 72, wherein the blocking member is movable between a first position corresponding to the open position of the selective air intake mechanism and a second position corresponding to the closed position of the selective air intake mechanism.

74. The device of claim 72, wherein the blocking member is disposed external to the first chamber.

75. The device of claim 72, wherein the blocking member is in the form of a slidable plate mounted on a wall defining the first chamber.

76. The device of claim 75, wherein the plate slides between a first position blocking the air intake orifice and a second position unblocking the air intake orifice.

77. The device of claim 76, wherein the plate slides between stop members formed on the wall.

78. A device for dispensing a product, comprising:

a first chamber configured to initially contain at least one of a first composition and a mixture of the first composition and a second composition;

a second chamber configured to be in flow communication with the first chamber and to contain the second composition; and an actuator configured to be actuated to cause an amount of product contained in the first chamber to be dispensed from the first chamber, the product including one of the first composition, the second composition, and the mixture of the first and second compositions, wherein the device is configured such that when the second composition is in the second chamber, a user may select a dispensing mode chosen from a first dispensing mode wherein a concentration of the product dispensed from the first chamber automatically varies as a function of a total amount of product dispensed from the first chamber, and a second dispensing mode wherein the concentration of the product dispensed from the first chamber remains substantially constant as a function of a total amount of product dispensed from the first chamber.

79. The device of claim 78, wherein in the first dispensing mode, the device is configured to automatically vary an amount of the second composition in the product being dispensed.

80. The device of claim 78, wherein the first chamber initially contains one of the first composition and the mixture, and the second chamber contains the second composition, and wherein the first and second compositions have differing characteristics.

81. The device of claim 78, wherein the product dispensed from the first chamber is dispensed from the device.

82. The device of claim 78, wherein the first chamber initially contains one of the first composition and the mixture, and the second chamber contains the second composition, and wherein the product dispensed from the first chamber has an effect that varies with the concentration of the product.

83. The device of claim 82, wherein the effect is at least one of a cosmetic, pharmaceutical, and dermatological effect on at least one of skin and hair.

84. The device of claim 83, wherein the effect is an effect on skin color.

85. The device of claim 83, wherein the effect is an effect on hair color.

86. The device of claim 83, wherein the effect is an effect on sun protection factor.

87. The device of claim 79, further comprising a flow passage for placing the first and second chambers in flow communication with each other.

88. The device of claim 87, wherein the flow passage has a first end opening into the second chamber, a second end opening into the first chamber, and a substantially inverted U-shaped portion between the first and the second ends.

89. The device of claim 87, wherein the flow passage is configured to prevent flow communication of the first and second chambers prior to a first use of the device to dispense the product.

90. The device of claim 89, further comprising a removable cover configured to cover a dispensing orifice through which the product flows from the first chamber and out of the device, wherein removing the removable cover permits the flow passage to place the first and second chambers in flow communication.

91. The device of claim 90, wherein the removable cover is operably coupled to a clamping mechanism configured to clamp the flow passage to prevent flow communication between the first and second chambers prior to the first use of the device.

92. The device of claim 78, further comprising a pump configured to flow the product from the first chamber.

93. The device of claim 92, wherein the actuator is operably coupled to the pump such that actuation of the actuator causes pumping of the pump.

94. The device of claim 93, wherein the actuator includes a push-button on the pump.

95. The device of claim 92, further comprising a dip tube extending from the pump into the first chamber to place the pump in flow communication with the first chamber.

96. The device of claim 92, wherein the pump defines an air intake orifice configured to be in flow communication with the second chamber.

97. The device of claim 96, wherein the air intake orifice is configured to flow air from outside the device to inside the second chamber in response to actuation of the pump dispensing the product from the first chamber when the dispenser is in the first dispensing mode.

98. The device of claim 97, wherein the air intake orifice is configured to flow an amount of air into the second chamber approximately equal to the amount of the product dispensed from the first chamber when the dispenser is in the first dispensing mode.

99. The device of claim 98, wherein an amount of second composition substantially equal to the amount of air flowed through the air intake orifice flows from the second chamber toward the first chamber as the product in the first chamber is dispensed from the first chamber when the dispenser is in the first dispensing mode.

100. The device of claim 78, wherein the first chamber is substantially sealed from air intake when the dispenser is in the first dispensing mode.

101. The device of claim 78, wherein the first chamber and the second chamber have approximately the same volume.

102. The device of claim 78, wherein an amount of the product in the first chamber remains substantially constant until all the second composition initially contained in the second chamber has been moved from the second chamber when the device is in the first dispensing mode.

103. The device of claim 78, wherein the device has a size permitting the device to be held in a single hand of a user while the product is dispensed.

104. The device of claim 78, further comprising a selective air intake mechanism configured to selectively flow intake air into the first chamber from outside the first chamber in response to dispensing product from the first chamber.

105. The device of claim 104, wherein the selective air intake mechanism is configured to be selectively placed in an open position for flowing intake air into the first chamber and in a closed position for preventing a flow of intake air into the first chamber via the selective air intake mechanism.

106. The device of claim 105, wherein placing the air intake mechanism in the open position places the dispenser in the second dispensing mode and placing the air intake mechanism in the closed position places the dispenser in the first dispensing mode.

107. A dispensing device comprising:

a first chamber;

a second chamber;

a portion including a dispensing outlet intended to be placed in flow communication with the first chamber to dispense contents of the first chamber;

a selective air intake mechanism configured to selectively be placed in an open position to allow a flow of outside air into the first chamber and in a closed position to prevent a flow of outside air into the first chamber via the selective air intake mechanism; and a flow passage for providing flow from the second chamber to the first chamber, wherein the flow passage includes a duct including at least a portion having a substantially U-shape.

108. The device of claim 107, wherein the substantially U-shaped portion includes a curved section and a pair of leg sections extending from the curved section, the curved section being located above the leg sections and being adjacent to an upper end of the device.

109. The device of claim 108, wherein an uppermost portion of the curved section is above at least one of a maximum fill level of the first chamber and a maximum fill level of the second chamber.

110. The device of claim 107, wherein the flow passage includes a first end opening into the second chamber and a second end opening into the first chamber, the first end being above the second end.

111. The device of claim 107, wherein a bottom of the second chamber is above the bottom of the first chamber.

112. The device of claim 107, further comprising a pump to dispense contents of the first chamber through the dispensing outlet.

113. The device of claim 112, wherein the pump is configured to apply a vacuum force to remove contents from the first chamber, the vacuum force inducing flow from the second chamber to the first chamber via the flow passage when the selective air intake mechanism is in the closed position.

114. The device of claim 112, wherein the pump includes an actuator for actuating the pump.

115. The device of claim 112, wherein the pump includes an air intake passage in flow communication with the second chamber.

116. The device of claim 112, further comprising a dip tube extending from the pump into the first chamber.

117. The device of claim 107, wherein the first chamber contains one of a first composition and a mixture of the first composition and a second composition, and wherein the second chamber contains the second composition, the second composition flowing to the first chamber via the flow passage in response to dispensing from the first chamber when the selective air intake mechanism is in the closed position.

118. The device of claim 117, wherein at least one of the first and second compositions has an effect chosen from a cosmetic, pharmaceutical, and dermatological effect.

119. The device of claim 117, wherein a first part of the flow passage initially contains the one of the first composition and the mixture and a second part of the flow passage initially contains the second composition.

120. The device of claim 119, wherein air is initially contained in the flow passage between the first and second parts.

121. The device of claim 117, further comprising a separation mechanism configured to limit flow through the flow passage.

122. The device of claim 107, wherein the device has a size permitting the device to be held in a single hand of a user while the contents are dispensed.

123. The device of claim 107, wherein the first and second chambers and the flow passage are defined in a single piece of molded plastic material.

124. The device of claim 107, wherein the selective air intake mechanism comprises an orifice in flow communication with the first chamber.

125. The device of claim 124, wherein the selective air intake mechanism comprises a blocking member for selectively blocking the orifice to prevent outside air from flowing into the first chamber through the orifice.

126. A dispensing device comprising:

a first chamber;

a second chamber;

a portion including a dispensing outlet intended to be placed in flow communication with the first chamber to dispense contents of the first chamber;

a selective air intake mechanism configured to selectively be placed in an open position to allow a flow of outside air into the first chamber and in a closed position to prevent a flow of outside air into the first chamber via the selective air intake mechanism; and a flow passage for providing flow from the second chamber to the first chamber, the flow passage being configured in the form of a siphon.

127. The device of claim 126, wherein a bottom of the second chamber is above a bottom of the first chamber.

128. The device of claim 126, further comprising a pump to dispense contents of the first chamber through the dispensing outlet.

129. The device of claim 128, wherein the pump is configured to apply a vacuum force to remove contents from the first chamber, the vacuum force inducing flow from the second chamber to the first chamber via the flow passage when the selective air intake mechanism is in the closed position.

130. The device of claim 128, wherein the pump includes an actuator for actuating the pump.

131. The device of claim 128, wherein the pump includes an air intake passage in flow communication with the second chamber.

132. The device of claim 128, further comprising a dip tube extending from the pump into the first chamber.

133. The device of claim 126, wherein the first chamber contains one of a first composition and a mixture of the first composition and a second composition, and wherein the second chamber contains the second composition, the second composition flowing to the first chamber via the flow passage in response to dispensing from the first chamber when the selective air intake mechanism is in the closed position.

134. The device of claim 133, wherein at least one of the first and second compositions has an effect chosen from a cosmetic, pharmaceutical, and dermatological effect.

135. The device of claim 133, wherein a first part of the flow passage initially contains the one of the first composition and the mixture and a second part of the flow passage initially contains the second composition.

136. The device of claim 135, wherein air is initially contained in the flow passage between the first and second parts.

137. The device of claim 133, further comprising a separation mechanism configured to limit flow through the flow passage.

138. The device of claim 126, wherein the device has a size permitting the device to be held in a single hand of a user while the contents are dispensed.

139. The device of claim 126, wherein the first and second chambers and the flow passage are defined in a single piece of molded plastic material.

140. The device of claim 126, wherein the selective air intake mechanism comprises an orifice in flow communication with the first chamber.

141. The device of claim 140, wherein the selective air intake mechanism comprises a blocking member for selectively blocking the orifice to prevent outside air from flowing into the first chamber through the orifice.

142. A dispensing device comprising:

a first chamber containing a first composition;

a second chamber containing a modifying composition;

means, capable in response to an actuation command, for dispensing a volume of contents from the first chamber;

means for selectively allowing a flow of air into the first chamber in response to dispensing of the volume of contents from the first chamber; and means, in response to reduced pressure in the first chamber, for passing a volume of said modifying composition from the second chamber toward the first chamber.

143. The device of claim 142, wherein the device is configured such that the volume of contents being dispensed from the first chamber is initially the first composition and, after at least one actuation command, includes both the first composition and the modifying composition when the means for selectively allowing a flow of air into the first chamber does not provide said flow of air into the first chamber.

144. The device of claim 142, wherein the means for selectively allowing a flow of air into the first chamber comprises an orifice providing selective flow communication between outside air and the first chamber.

145. The device of claim 144, wherein the means for selectively allowing a flow of air into the first chamber further comprises means for selectively blocking the orifice to prevent flow communication between the first chamber and outside air via the orifice.

146. The device of claim 145, wherein the means for selectively blocking the orifice comprises a blocking member movable between a closed position in which the orifice is blocked and an open position in which the orifice is unblocked.

147. The device of claim 146, wherein the blocking member includes a slidable shutter.

148. The device of claim 142, further comprising an air intake member in flow communication with the second chamber and configured to allow an intake of outside air into the second chamber in response to an amount of the modifying composition flowing out of the second chamber.

149. The device of claim 148, wherein the air intake member allows a volume of air to flow into the second chamber substantially equal to the volume of the modifying composition flowing out of the second chamber.

150. The device of claim 142, wherein the means for passing the modifying composition comprises a siphon duct configured to place the first chamber and second chamber in flow communication with each other.

151. A method of dispensing, the method comprising:

providing a dispenser having a first chamber containing at least one of a first composition and a mixture of the first composition and a second composition, and a second chamber containing the second composition, said first and second chambers being in flow communication with each other;

flowing at least a portion of the contents of the first chamber from the dispenser to dispense the contents;

selectively blocking air flow into the first chamber via a selective air intake mechanism in flow communication with the first chamber; and passing second composition from the second chamber to the first chamber in response to the contents of the first chamber being dispensed during the selective blocking of air flow.

152. The method of claim 151, further comprising preventing flow communication between the first and second chambers prior to a first flowing of the contents from the first chamber.

153. The method of claim 152, further comprising placing the first and second chambers in flow communication with each other.

154. The method of claim 151, wherein the flowing from the dispenser includes initially flowing the first composition and then selectively flowing the mixture from the dispenser when air flow into the first chamber via the selective air intake mechanism is blocked.

155. The method of claim 154, wherein an amount of second composition in the mixture increases as more second composition is passed into the second chamber.

156. The method of claim 151, further comprising mixing the second composition passing into the first chamber with the contents of the first chamber.

157. The method of claim 151, wherein the passing includes flowing the second composition from the second chamber toward the first chamber in an amount substantially equal to the amount of the contents flowing from the first chamber.

158. The method of claim 151, further comprising intaking an amount of air from outside the dispenser into the second chamber in an amount substantially equal to the amount of the second composition that flows from the second chamber toward the first chamber during the passing.

159. The method of claim 151, wherein the flowing from the first chamber includes pumping from the first chamber via a pump in flow communication with the first chamber.

160. The method of claim 159, wherein the pump includes an air intake orifice, the air intake orifice flowing air outside the dispenser into the second chamber during pumping.

161. The method of claim 151, further comprising varying the respective amounts of the first composition and the second composition in the contents as a function of a total amount of the contents flowed from the first chamber when air flow into the first chamber via the selective air intake mechanism is blocked.

162. The method of claim 151, wherein the flowing of the contents of the first chamber includes automatically varying the respective amounts of the first composition and the second composition in the contents in the first chamber in response to the flowing when the air flow into the first chamber via the selective air intake mechanism is blocked.

163. The method of claim 151, wherein the flowing includes flowing the second composition from the first chamber after a predetermined amount of one of the first composition and the mixture has flowed from the first chamber when air flow into the first chamber via the selective air intake mechanism is blocked.

164. The method of claim 151, wherein the flowing from the first chamber includes selectively flowing without air intake into the first chamber via the selective air intake mechanism when the second chamber contains the second composition.

165. The method of claim 151, wherein the flowing includes dispensing from the dispenser a product having at least one of a cosmetic, pharmaceutical and dermatological effect.

166. The method of claim 165, further comprising applying the product to at least one of hair and skin of an individual.

167. The method of claim 166, wherein the dispensing of the product includes dispensing onto the skin a product having an effect on skin color.

168. The method of claim 166, wherein the dispensing of the product includes dispensing onto the hair a product having an effect on hair color.

169. The method of claim 166, wherein the dispensing of the product includes dispensing onto the skin a product having a sun protection factor effect.

170. The method of claim 165, wherein the effect varies with the relative amount of at least one of the first composition and the second composition that flows from the first chamber.

171. The method of claim 165, wherein the effect varies with the total amount of the contents flowed from the first chamber when the air flow into the first chamber via the selective air intake mechanism is blocked.

172. The method of claim 151, wherein the passing includes transferring the second composition to the second chamber via a flow passage including a siphon.

173. The method of claim 151, further comprising selectively flowing air into the first chamber via the selective air intake mechanism in response to flowing at least a portion of the contents of the first chamber from the dispenser, wherein an amount of the second composition in the second chamber remains constant when the air flows into the first chamber via the selective air intake mechanism.

174. The method of claim 151, wherein the flowing the contents of the first chamber from the dispenser comprises selectively flowing contents having one of a varying concentration as a function of the amount of contents flowed from the dispenser and a constant concentration as a function of the amount of contents flowed from the dispenser.

175. A method of dispensing a product, the method comprising:

providing a dispenser containing a first composition and a second composition substantially separated from one another prior to dispensing, the first composition and the second composition having at least one differing characteristic;

flowing a product from the dispenser, the product including relative concentrations of the first and second compositions; and selectively one of increasing and holding substantially constant, in response to a total amount of product flowed from the dispenser, the concentration of second composition in the product flowing from the dispenser.

176. The method of claim 175, further comprising initially flowing the first composition alone from the dispenser.

177. The method of claim 175, further comprising selectively mixing together the first composition and the second composition during the flowing of the product from the dispenser.

178. The method of claim 175, wherein the flowing includes pumping the product from the dispenser.

179. The method of claim 178, further comprising flowing outside air into the second chamber in an amount substantially corresponding to an amount of the product flowed from the dispenser when the concentration of second composition in the product flowing from the dispenser is selectively increasing.

180. The method of claim 175, wherein the providing of the dispenser includes providing a dispenser having a first chamber containing the first composition and a second chamber containing the second composition, the first and second chambers being in flow communication with each other.

181. The method of claim 180, wherein the flowing of the product from the dispenser includes flowing the product from the first chamber.

182. The method of claim 181, further comprising passing the second composition from the second chamber toward the first chamber when the concentration of second composition in the product flowing from the dispenser is selectively increasing.

183. The method of claim 181, wherein an amount of the product in the first chamber remains substantially constant until substantially all of the second composition initially contained in the second chamber has passed from the second chamber toward the first chamber when the concentration of second composition in the product flowing from the dispenser is selectively increasing.

184. The method of claim 183, wherein air is prevented from flowing into the first chamber when the second chamber contains the second composition and when the concentration of second composition in the product flowing from the dispenser is selectively increasing.

185. The method of claim 183, wherein air is flowed into the first chamber when the second chamber contains the second composition and when the concentration of second composition in the product flowing from the dispenser is selectively held constant.

186. The method of claim 175, wherein the product flowed from the dispenser includes at least one of a cosmetic, a pharmaceutical, and a dermatological effect.

187. The method of claim 186, further comprising applying the product to at least one of hair and skin of an individual.

188. The method of claim 186, wherein the effect varies with the ratio of the first composition to the second composition in the product.

189. The method of claim 188, wherein the product is applied to the skin and the effect is an effect on skin color.

190. The method of claim 188, wherein the product is applied to the hair and the effect is an effect on hair color.

191. The method of claim 188, wherein the product is applied to the skin and the effect is a sun protection factor effect.

192. A method of dispensing a product, the method comprising:

providing the device of claim 1 with the first chamber containing at least the first composition and the second chamber containing the second composition;

selectively placing the selective air intake mechanism in one of the open position and the closed position; and actuating the actuator to dispense an amount of the product from the first chamber and out of the device.

193. The method of claim 192, further comprising placing the selective air intake mechanism in the closed position and automatically varying relative concentrations of the first composition and the second composition in the product dispensed out of the device by actuating the actuator a number of times.

194. The method of claim 193, wherein the varying of relative concentrations of the first and second compositions includes varying at least one of a cosmetic, a dermatological, and a pharmaceutical effect of the product.

195. The method of claim 192, further comprising varying relative concentrations of the first composition and the second composition in the product dispensed out of the device as a function of a total amount of the product dispensed out of the device.

196. The method of claim 195, wherein the varying of relative concentrations of the first and second compositions includes varying at least one of a cosmetic, a dermatological, and a pharmaceutical effect of the product.

197. The method of claim 192, further comprising placing the selective air intake mechanism in the open position and maintaining relative concentrations of the first composition and the second composition dispensed out of the device in response to actuating the actuator.

198. The method of claim 193, wherein the maintaining of relative concentrations of the first and second compositions includes maintaining at least one of a cosmetic, a dermatological, and a pharmaceutical effect of the product.

199. The method of claim 193, further comprising maintaining relative concentrations of the first composition and the second composition in the product dispensed out of the device as a function of a total amount of the product dispensed out of the device.

200. The method of claim 199, wherein the maintaining of relative concentrations of the first and second compositions includes varying at least one of a cosmetic, a dermatological, and a pharmaceutical effect of the product.

201. The method of claim 192, further comprising applying the product dispensed out of the device to at least one of hair and skin.

202. The method of claim 201, wherein the product changes color of at least one of hair and skin.

203. The method of claim 202, wherein the color change of the at least one of the hair and the skin increases with a total amount of the product that has been dispensed out of the device when the selective air intake mechanism is placed in the closed position.

204. The method of claim 202, wherein the color change of the at least one of the hair and the skin remains the same with a total amount of the product that has been dispensed out of the device when the selective air intake mechanism is placed in the open position.

205. The method of claim 201, wherein the applying of the product includes applying a sun protection factor to the at least one of the hair and the skin.

206. The method of claim 205, wherein the sun protection factor decreases with a total amount of the product that has been dispensed out of the device when the selective air intake mechanism is placed in the closed position.

207. The method of claim 205, wherein the sun protection factor remains the same with a total amount of product that has been dispensed out of the device when the selective air intake mechanism is placed in the open position.

208. A method of dispensing a product, the method comprising:

providing the device of claim 50 with the first chamber containing at least the first composition and the second chamber containing the second composition;

selectively placing the selective air intake mechanism in one of the open position and the closed position; and actuating the actuator to dispense an amount of product from the first chamber and out of the device.

209. The method of claim 208, further comprising placing the selective air intake mechanism in the closed position and automatically varying the concentration of the product dispensed from the first chamber by mixing the first and second compositions in the first chamber.

210. The method of claim 209, wherein the varying of the concentration of the product dispensed from the first chamber includes varying at least one of a cosmetic, a dermatological, and a pharmaceutical effect of the product.

211. The method of claim 208, further comprising placing the selective air intake mechanism in the closed position prior to dispensing product from the dispenser and actuating the actuator a predetermined number of times to dispense the product from the dispenser thereby automatically varying the concentration of the product dispensed from the first chamber.

212. The method of claim 208, further comprising applying the product dispensed out of the device to at least one of hair and skin.

213. The method of claim 212, wherein the product changes color of at least one of hair and skin.

214. The method of claim 213, wherein the color change of the at least one of hair and skin increases with a total amount of the product that has been dispensed out of the device in response to actuating the actuator when the selective air intake mechanism is placed in the closed position.

215. The method of claim 213, wherein the color change of the at least one of hair and skin remains the same with a total amount of the product that has been dispensed out of the device in response to actuating the actuator when the selective air intake mechanism is placed in the open position.

216. The method of claim 212, wherein the applying of the product includes applying a sun protection factor to the at least one of the hair and the skin.

217. The method of claim 216, wherein the sun protection factor decreases with a total amount of the product that has been dispensed out of the device in response to actuating the actuator when the selective air intake mechanism is placed in the closed position.

218. The method of claim 216, wherein the sun protection factor remains the same with a total amount of the product that has been dispensed out of the device in response to actuating the actuator when the selective air intake mechanism is placed in the open position.

219. A method of dispensing a product, the method comprising:

providing the device of claim 78 with the first chamber containing at least the first composition and the second chamber containing the second composition;

selecting the dispensing mode; and dispensing an amount of product from the first chamber and out of the device, the product including one of the first composition and a mixture of the first composition and the second composition.

220. The method of claim 219, wherein the selecting includes selecting the first dispensing mode and thereby varying the concentration of the product dispensed from the first chamber by mixing the first and second compositions in the first chamber.

221. The method of claim 220, wherein the dispensing includes dispensing the product a plurality of times, the dispensing varying the concentration of the product dispensed from the first chamber.

222. The method of claim 219, wherein the product has at least one of a cosmetic, a dermatological, and a pharmaceutical effect.

223. The method of claim 222, further comprising applying the product dispensed out of the device to at least one of hair and skin.

224. The method of claim 223, wherein the applying of the product changes color of at least one of hair and skin.

225. The method of claim 224, wherein the selecting the dispensing mode includes selecting the first dispensing mode and wherein the color change of the at least one of hair and skin increases with a total amount of the product that has been dispensed out of the device.

226. The method of claim 224, wherein the selecting the dispensing mode includes selecting the second dispensing mode and wherein the color change of the at least one of hair and skin remains the same with a total amount of the product that has been dispensed out of the device.

227. The method of claim 223, wherein the applying of the product includes applying a sun protection factor to the at least one of the hair and the skin.

228. The method of claim 227, wherein the selecting the dispensing mode includes selecting the first dispensing mode and wherein the sun protection factor decreases with a total amount of the product that has been dispensed out of the device.

229. The method of claim 227, wherein the selecting the dispensing mode includes selecting the second dispensing mode and wherein the sun protection factor remains the same with a total amount of the product that has been dispensed out of the device.

230. A method of dispensing a product, the method comprising:

providing the device of claim 107 with the first chamber containing at least a first composition and the second chamber containing a second composition;

selectively placing the air intake mechanism in one of the open position and the closed position; and dispensing an amount of product from the first chamber and out of the device, the product including at least one of the first composition and a mixture of the first and second compositions.

231. The method of claim 230, wherein the selectively placing the selective air intake mechanism includes placing the selective air intake mechanism in the closed position and the dispensing includes dispensing the product a plurality of times, the dispensing varying the concentration of the product dispensed from the first chamber.

232. The method of claim 231, wherein the varying of the concentration of the product dispensed from the first chamber includes varying at least one of a cosmetic, a dermatological, and a pharmaceutical effect of the product.

233. The method of claim 230, wherein the selectively placing the selective air intake mechanism includes placing the selective air intake mechanism in the closed position and the dispensing includes initially dispensing the first composition alone and then dispensing the mixture.

234. The method of claim 233, further comprising varying a concentration of the mixture in the first chamber.

235. The method of claim 234, wherein at least one of a cosmetic, a dermatological, and a pharmaceutical effect of the product varies with the concentration of the mixture.

236. The method of claim 233, wherein upon further dispensing from the first chamber, relative concentrations of the first composition and the second composition in the mixture varies.

237. The method of claim 236, wherein at least one of a cosmetic, a dermatological, and a pharmaceutical effect of the product varies with the relative concentrations of the first composition and the second composition in the mixture.

238. The method of claim 230, wherein the selectively placing the selective air intake mechanism includes placing the selective air intake mechanism in the open position and the dispensing includes dispensing a product having a substantially constant concentration.

239. The method of claim 238, wherein at least one of a cosmetic, a dermatological, and a pharmaceutical effect of the product varies with the concentration of the product.

240. The method of claim 238, wherein at least one of a cosmetic, a dermatological, and a pharmaceutical effect of the product varies with the relative concentrations of the first composition and the second composition in the product.

241. The method of claim 230, further comprising applying the product dispensed out of the device to at least one of hair and skin.

242. The method of claim 241, wherein the product changes color of at least one of hair and skin.

243. The method of claim 242, wherein the color change of the at least one of hair and skin increases with a total amount of the product that has been dispensed out of the device when the selective air intake mechanism is placed in the closed position.

244. The method of claim 242, wherein the color change of the at least one of hair and skin remains the same with a total amount of the product that has been dispensed out of the device when the selective air intake mechanism is placed in the open position.

245. The method of claim 241, wherein the applying of the product includes applying a sun protection factor to the at least one of the hair and the skin.

246. The method of claim 245, wherein the sun protection factor decreases with a total amount of the product that has been dispensed out of the device when the selective air intake mechanism is in the open position.

247. The method of claim 245, wherein the sun protection factor remains the same with a total amount of the product that has been dispensed out of the device when the selective air intake mechanism is in the closed position.

* * * * *

UNITED STATES PATENT AND TRADEMARK OFFICE

CERTIFICATE OF CORRECTION

PATENT NO. : 6,427,870 B2 
DATED : August 6, 2002
INVENTOR(S) : Vincent De LaForcade It is certified that error appears in the above-identified patent and that said Letters Patent is hereby corrected as shown below:

Title page,
Item [54], Title, replace "PRODUCTS" with -- PRODUCT --;

Column 33,
Line 31, replace "claim 193" with -- claim 197 --;
Line 35, replace "claim 193" with -- claim 197 --.

Signed and Sealed this

Twelfth Day of November, 2002

*Attest:*

JAMES E. ROGAN

*Attesting Officer* *Director of the United States Patent and Trademark Office*